US011644534B2

(12) United States Patent
Maor et al.

(10) Patent No.: US 11,644,534 B2
(45) Date of Patent: May 9, 2023

(54) APPARATUS, SYSTEM AND METHOD OF RADAR DATA COMPRESSION

(71) Applicant: INTEL CORPORATION, Santa Clara, CA (US)

(72) Inventors: Lior Maor, Petah Tikva (IL); Alon Cohen, Modi'in-Maccabim-Reut (IL)

(73) Assignee: INTEL CORPORATION, Santa Clara, CA (US)

( * ) Notice: Subject to any disclaimer, the term of this patent is extended or adjusted under 35 U.S.C. 154(b) by 680 days.

(21) Appl. No.: 16/727,234

(22) Filed: Dec. 26, 2019

(65) Prior Publication Data

US 2020/0150220 A1    May 14, 2020

(51) Int. Cl.
*G01S 7/03* (2006.01)
*G01S 13/931* (2020.01)
*H04B 7/0413* (2017.01)

(52) U.S. Cl.
CPC ............... *G01S 7/03* (2013.01); *G01S 7/038* (2013.01); *G01S 13/931* (2013.01); *H04B 7/0413* (2013.01)

(58) Field of Classification Search
CPC .......... G01S 7/03; G01S 7/038; G01S 13/931; H04B 7/0413
See application file for complete search history.

(56) References Cited

U.S. PATENT DOCUMENTS

| 5,646,623 | A | * | 7/1997 | Walters | G01S 13/32 342/112 |
|---|---|---|---|---|---|
| 5,969,667 | A | * | 10/1999 | Farmer | G01S 7/4056 342/194 |
| 8,665,132 | B2 | * | 3/2014 | Ranney | G01S 13/9089 342/25 R |
| 9,042,838 | B2 | * | 5/2015 | Braithwaite | H04B 1/525 455/501 |
| 9,172,476 | B2 | * | 10/2015 | Nguyen | G01S 7/023 |
| 9,448,300 | B2 | * | 9/2016 | Jansen | G01S 13/34 |
| 9,753,121 | B1 | * | 9/2017 | Davis | G01S 13/18 |
| 10,241,202 | B2 | * | 3/2019 | Becker | G01S 13/90 |
| 11,163,050 | B2 | * | 11/2021 | Bharadia | G01S 13/42 |
| 2002/0044082 | A1 | * | 4/2002 | Woodington | H01Q 13/10 342/128 |
| 2002/0067287 | A1 | * | 6/2002 | Delcheccolo | H01Q 3/24 340/901 |
| 2002/0190891 | A1 | * | 12/2002 | Viana | H01Q 21/064 342/28 |
| 2003/0210172 | A1 | * | 11/2003 | Pleva | H01Q 13/18 342/72 |
| 2003/0210182 | A1 | * | 11/2003 | Hanson | H01Q 21/0043 342/197 |

(Continued)

*Primary Examiner* — Peter M Bythrow
(74) *Attorney, Agent, or Firm* — Shichrur & Co.

(57) ABSTRACT

For example, a radar data compressor may include an input to receive input digital raw data comprising digital samples of received radar signals at a plurality of receive (Rx) antennas; a raw data compressor configured to compress the input digital raw data into compressed digital data, for example, by wiping off from the input digital raw data one or more wiped-off signals, e.g., based on a wipe-off criterion applied to the input digital raw data; and a compressor output to provide compressed data including the compressed digital data, and signal parameter information defining the one or more wiped-off signals.

24 Claims, 14 Drawing Sheets

(56) References Cited

U.S. PATENT DOCUMENTS

| | | | | |
|---|---|---|---|---|
| 2009/0262005 A1* | 10/2009 | McNeill | ............... | G01S 13/9029 |
| | | | | 342/28 |
| 2013/0102254 A1* | 4/2013 | Cyzs | ..................... | H04B 1/10 |
| | | | | 455/63.1 |
| 2013/0113647 A1* | 5/2013 | Sentelle | .................. | G01S 13/04 |
| | | | | 342/22 |
| 2014/0348018 A1* | 11/2014 | Bharadia | .................. | H04B 1/56 |
| | | | | 370/278 |
| 2015/0156004 A1* | 6/2015 | Khandani | ............. | H04L 1/0031 |
| | | | | 370/278 |
| 2016/0226653 A1* | 8/2016 | Bharadia | ................ | H04B 1/525 |
| 2017/0090013 A1* | 3/2017 | Paradie | ................ | G01S 7/2926 |
| 2017/0219691 A1* | 8/2017 | Farmer | .................. | G01S 7/038 |
| 2017/0293025 A1* | 10/2017 | Davis | ..................... | G01S 7/023 |
| 2017/0315213 A1* | 11/2017 | Ocket | ....................... | G01S 7/34 |
| 2017/0315221 A1* | 11/2017 | Cohen | ..................... | G01S 13/42 |
| 2020/0003866 A1* | 1/2020 | Bauduin | ................ | G01S 7/0234 |
| 2020/0132804 A1* | 4/2020 | Yeh | ....................... | G01S 7/4021 |
| 2021/0033718 A1* | 2/2021 | Kobayashi | ............... | G01S 7/282 |
| 2021/0320425 A1* | 10/2021 | Arkind | ................... | H01Q 21/28 |
| 2021/0356557 A1* | 11/2021 | Samala | ................... | G01S 7/038 |
| 2021/0364634 A1* | 11/2021 | Davis | .................... | G01S 13/931 |

\* cited by examiner

APPARATUS, SYSTEM AND METHOD OF RADAR DATA COMPRESSION

TECHNICAL FIELD

Embodiments described herein generally relate to radar data compression.

BACKGROUND

A vehicular radar may be used to detect one or more objects, for example, in a vicinity of a vehicle.

There is a need for a technical solution to handle a large amount of data, which may be generated by the vehicular radar.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
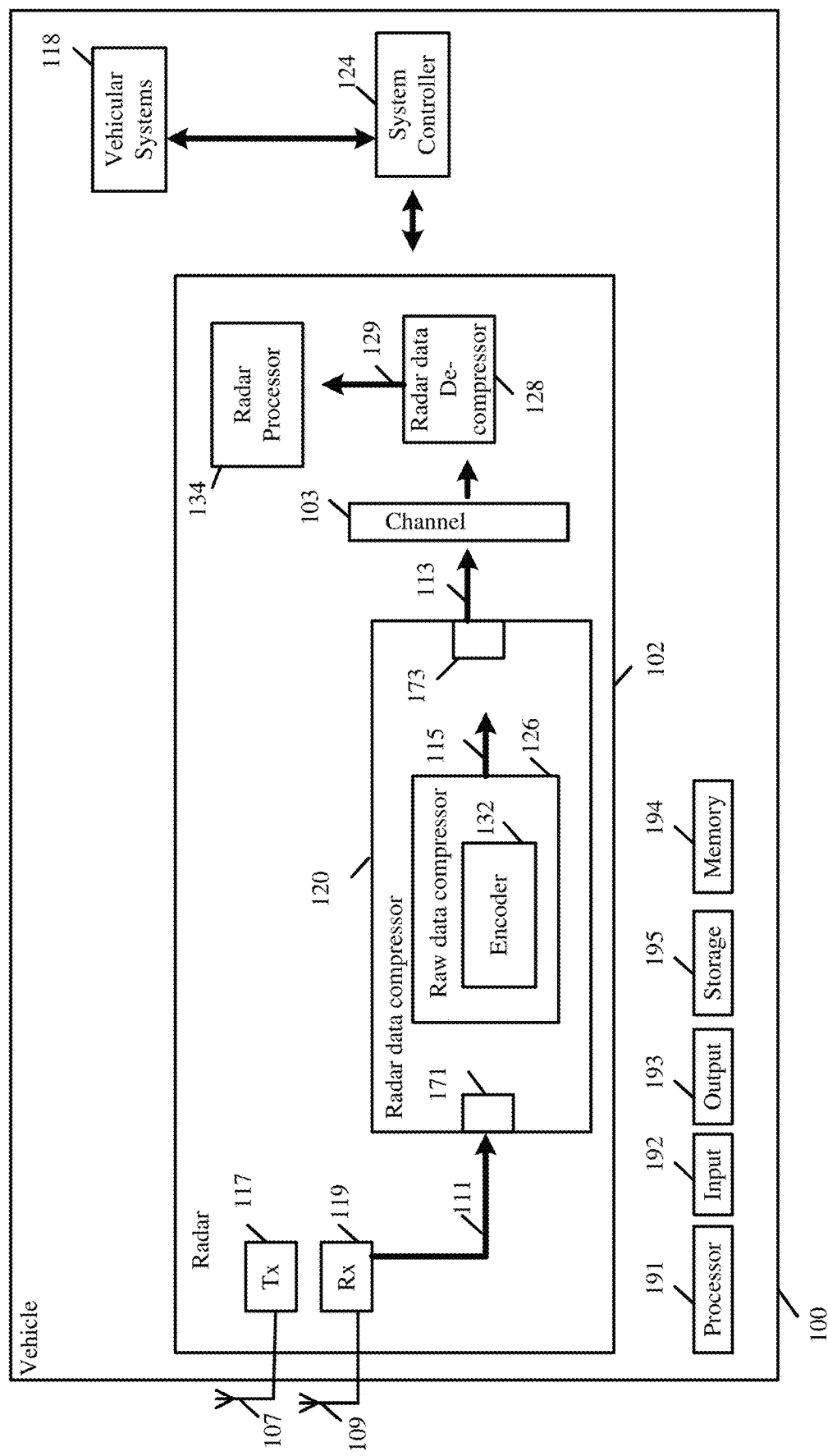
FIG. 1 is a schematic block diagram illustration of a vehicle, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a radar sensor, a radar device, a radar system, a vehicle, a vehicular system, an autonomous vehicular system, a vehicular communication system, a vehicular device, a sensor device, a User Equipment (UE), a Mobile Device (MD), a wireless station (STA), a sensor device, a non-vehicular device, a mobile or portable device, and the like.

Some embodiments may be used in conjunction with Radio Frequency (RF) systems, radar systems, vehicular radar systems, detection systems, or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "communicating" as used herein with respect to a communication signal includes transmitting the communication signal and/or receiving the communication signal. For example, a communication unit, which is capable of communicating a communication signal, may include a transmitter to transmit the communication signal, and/or a communication receiver to receive the communication signal. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with an RF frequency in a frequency band having a starting frequency above 10 Gigahertz (GHz), for example, a frequency band having a starting frequency between 10 GHz to 120 GHz. For example, some demonstrative embodiments may be used in conjunction with an RF frequency having a starting frequency above 30 GHz, for example, above 45 GHz, e.g., above 60 GHz. For example, some demonstrative embodiments may be used in conjunction with an automotive radar frequency band, e.g., a frequency band between 76 GHz and 81 GHz. However, other embodiments may be implemented utilizing any other suitable frequency bands.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to RF radar signals. However, other embodiments may be implemented with respect to any other wireless signals, wireless communication signals, communication scheme, network, standard and/or protocol.

Reference is now made to FIG. 1, which schematically illustrates a block diagram of a vehicle 100, in accordance with some demonstrative embodiments.

In some demonstrative embodiments, vehicle 100 may include a car, a truck, a motorcycle, a bus, or any other vehicle.

In some demonstrative embodiments, vehicle 100 may be configured to support and/or implement a vehicular system, for example, to be implemented and/or to be mounted in vehicle 100.

In some demonstrative embodiments, the vehicular system may include, for example, an autonomous vehicle system, an automated driving system, a driver assistance and/or support system, and/or the like.

In some demonstrative embodiments, vehicle 100 may include a radar 102. For example, radar 102 may include a radar detecting device, a radar sensing device, a radar sensor, or the like, e.g., as described below.

In some demonstrative embodiments, radar 102 may include a Multiple Input Multiple Output (MIMO) radar, e.g., as described below.

In some demonstrative embodiments, radar 102 may be configured to detect, and/or sense, one or more objects, which are located in a vicinity, e.g., a far vicinity and/or a near vicinity, of the vehicle, and to provide one or more parameters, attributes and/or information with respect to the objects.

In some demonstrative embodiments, the objects may include other vehicles, pedestrians, traffic signs, traffic lights, roads and/or the like.

In some demonstrative embodiments, the one or parameters, attributes and/or information with respect to the object may include a range of the objects from the vehicle, a location of the object with respect to the vehicle, a relative speed of the object, and/or the like.

In some demonstrative embodiments, vehicle 100 may include a system controller 124 configured to control one or more functionalities, components, devices, systems and/or elements of vehicle 100.

In some demonstrative embodiments, system controller 124 may include, or may be implemented, partially or entirely, by circuitry and/or logic, e.g., one or more processors including circuitry and/or logic, memory circuitry and/or logic. Additionally or alternatively, one or more functionalities of system controller 124 may be implemented by logic, which may be executed by a machine and/or one or more processors, e.g., as described below.

In one example, system controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other embodiments, system controller 124 may be implemented by one or more additional or alternative elements of vehicle 100.

In some demonstrative embodiments, controller 124 may be configured to control one or more vehicular systems 118 of vehicle 100, e.g., as described below.

In some demonstrative embodiments, vehicular systems 118 may include, for example, a steering system, a braking system, a driving system, and/or any other system of the vehicle 100.

In some demonstrative embodiments, system controller 124 may configured to control radar 102, and/or to process one or parameters, attributes and/or information from radar 102.

In some demonstrative embodiments, system controller 124 may be configured, for example, to control the vehicular systems 118 of the vehicle, for example, based on radar information from radar 102 and/or one or more other sensors of the vehicle, e.g., Light Detection and Ranging (LIDAR) sensors, camera sensors, and/or the like.

In one example, system controller 124 may control the steering system, the braking system, and/or any other vehicular systems 118 of vehicle 100, for example, based on the information from radar 102, e.g., based on one or more objects detected by radar 102.

In other embodiments, system controller 124 may be configured, for example, to control any other functionalities of vehicle 100.

In some demonstrative embodiments, vehicle 100 may include, for example, one or more of a processor 191, an input unit 192, an output unit 193, a memory unit 194, and/or a storage unit 195. Vehicle 100 may optionally include other suitable hardware components and/or software components. In some demonstrative embodiments, some or all of the components of one or more of vehicle 100 may be enclosed in a common housing or packaging, and may be interconnected or operably associated using one or more wired or wireless links. In other embodiments, components of one or more of vehicle 100 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS), e.g., a vehicular operating system, of vehicle 100 and/or of one or more suitable applications.

In some demonstrative embodiments, input unit 192 may include, for example, a touch-screen, a touch-pad, a trackball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a Solid State Drive (SSD), a floppy disk drive, a Compact Disk (CD) drive, a CD-ROM drive, a DVD drive, or other suitable removable or non-removable storage units. Memory unit 194 and/or storage unit 195, for example, may store data processed by vehicle 100.

In some demonstrative embodiments, radar 102 may include a radar processor 134 configured to process radar information of radar 102 and/or to control one or more operations of radar 102, e.g., as described below.

In some demonstrative embodiments, radar processor 134 may include, or may be implemented, partially or entirely, by circuitry and/or logic, e.g., one or more processors including circuitry and/or logic, memory circuitry and/or logic. Additionally or alternatively, one or more functionalities of radar processor 134 may be implemented by logic, which may be executed by a machine and/or one or more processors, e.g., as described below.

In some demonstrative embodiments, at least part of the functionality of radar processor 134 may be implemented as part of system controller 124.

In other embodiments, the functionality of radar processor 134 may be implemented as part of any other element of radar 102 and/or vehicle 100.

In some demonstrative embodiments, radar 102 may include a plurality of Transmit (Tx) antennas 107 to transmit Tx radar signals, e.g., as described below.

In some demonstrative embodiments, radar 102 may include a plurality of Tx chains 117 connected to, and/or associated with, Tx antennas 107, for example, configured to process the Tx radar signals, e.g., as described below.

In some demonstrative embodiments, radar 102 may include a plurality of Receive (Rx) antennas 109 to receive received radar signals, for example, based on the Tx radar signals, e.g., as described below.

In some demonstrative embodiments, radar 102 may include a plurality of Rx chains 119 connected to, and/or associated with, Rx antennas 109, for example, configured to process the received radar signals, e.g., as described below.

In one example, antennas 107 and/or 109 may include or may be part of any type of antennas suitable for transmitting and/or receiving radar signals. For example, antennas 107 and/or 109 may be implemented as part of any suitable configuration, structure and/or arrangement of one or more antenna elements, components, units, assemblies and/or arrays. For example, antennas 107 and/or 109 may be implemented as part of a phased array antenna, a multiple element antenna, a set of switched beam antennas, and/or the like. In some embodiments, antennas 107 and/or 109 may be implemented to support transmit and receive functionalities using separate transmit and receive antenna elements. In some embodiments, antennas 107 and/or 109 may be implemented to support transmit and receive functionalities using common and/or integrated transmit/receive elements.

In some demonstrative embodiments, radar 102 may include a communication channel 103 configured to communicate radar data between elements of radar 102 and/or vehicle 100, e.g., as described below.

In some demonstrative embodiments, the plurality of Tx antennas 107 may include N antenna elements, and the plurality of Rx antennas 109 may include M antenna elements.

In one example, radar 102 may be configured to implement MIMO radar technology, which may allow reduction of physical antenna array aperture, e.g., a reduction in a size and/or a number of antenna elements, for example, by transmission of orthogonal signals from Tx array 107, e.g., with the N antenna elements, and processing received signals in the Rx array 109, e.g., with the M antenna elements. The MIMO radar technology, may be equivalent to transmitting from one antenna and receiving with N*M antenna elements, e.g., under a far field approximation. An equivalent array of the size N*M may represent a virtual array, where locations of the virtual antenna elements may be a convolution of the locations of the physical antenna elements.

In some demonstrative embodiments, radar 102 may be configured to generate a four Dimensional (4D) image, for example, based on the received Rx signals via the virtual array.

In some demonstrative embodiments, data of a received Rx signal via the virtual array at an output of the Rx chains 119 may be packed and transferred to a BB processing unit, for example, to create the 4D image.

In one example, a data size to create a 4D image, for example, when N=24 and M=64, may be calculated, for example, based on one or more radar parameters, processes and/or settings, e.g., as follows:

A frame may include 257 chirps, or any other number of chirps.

A chirp may be sampled according to a sample rate of Fs=275 MHz, and may be 38.4 us long, which may result in 10560 samples per frame, or any other sampling rate may be used.

The frame may be received via the 64 Rx chains, or any other number of chains.

A complex sample may have a size of 11 bit I+11 bit Q, or any other sample size.

According to the above settings, a total Data Size may be $10560*64*257*2*11/(1024^2)/8=455.5$ Megabytes [MB].

According to this example, a data size of the data to create the 4D image may be very large to transfer and may require a large memory.

In one example, the size of the data to create a 4D image may be large, for example, even if using a reduced MIMO array having a reduced size, e.g., even if less than N=24 and/or M=64 antennas are used.

Some demonstrative embodiments are described herein with respect to an antenna array having a size of N=24 and M=64. However, any other antenna array may be implemented.

In some demonstrative embodiments, radar 102 may be configured to support implementation of a compression scheme configured to reduce, e.g., minimize, the amount and/or data size of data to be transferred to radar processor 134, for example, via communication channel 103, e.g., as described below.

In some demonstrative embodiments, implementing the compression scheme may reduce, e.g., significantly reduce, the amount of date and/or data transfer rates, which may allow reducing a memory size and/or cost.

In some demonstrative embodiments, radar 102 may include a radar data compressor 120 configured to compress digital raw data including digital samples of received radar signals at the plurality of Rx antennas 109, e.g., as described below.

In some demonstrative embodiments, communication channel 103 may communicate the compressed data from the radar data compressor 120, for example, to radar processor 134 and/or to any other elements of radar 102 and/or vehicle 100, e.g., as described below.

In one example, the compressed data may be communicated via communication channel 103 to radar processor, for example, for local processing of the compressed data at vehicle 100.

In another example, the compressed data may be stored by a memory, buffer or storage of vehicle 100, and may be communicated to one or more other systems of vehicle 100, e.g., for local processing, and/or to one or more external systems, e.g., for remote processing.

In some demonstrative embodiments, radar data compressor 120 may be configured to reduce an average number of bits that are transferred on a bus, e.g., via communication channel 103, between a raw data capturing unit and a processing unit, e.g., between Rx chains 119 and radar processor 134.

In some demonstrative embodiments, radar data compressor 120 may be configured to reduce the number of bits of the digital raw data, for example, by subtraction of estimated strong signals, e.g., corresponding to signals from targets and/or leakage signals, at an encoding phase; and addition of the estimated strong signals, for example, back at a decoder phase, for example, to achieve a lossless compression, e.g., as described below.

In some demonstrative embodiments, the compression scheme described herein may be used with one or more other, radar or non radar, MIMO technologies, for example, in cellular base stations, and/or for interference cancellation, for example, by not adding back undesired signals, e.g., such as the leakage signals and/or signals from undesired targets.

In some demonstrative embodiments, radar data compressor 120 may include an input 171 to receive input digital raw data 111 including the digital samples of the received radar signals at the plurality of Rx antennas 109, e.g., as described below.

In some demonstrative embodiments, radar data compressor 120 may include a raw data compressor 126 configured to compress the input digital raw data 111 into compressed digital data 115, e.g., as described below.

In some demonstrative embodiments, the raw data compressor 120 may be configured to wipe off one or more wiped-off signals from the input digital raw data, based on a wipe-off criterion.

In some demonstrative embodiments, for example, radar data compressor 120 may be configured to compress the input digital raw data 111, for example, by wiping off, removing, deleting and/or subtracting, from the input digital raw data 111 one or more wiped-off, removed, deleted and/or subtracted signals, for example, based on a wipe-off, removal, deletion and/or subtraction criterion applied to the input digital raw data 111, e.g., as described below.

Some demonstrative embodiments are described below with respect to wiping off one or more wiped-off signals from at least one signal. However, other embodiments may be implemented to additionally or alternatively include deleting one or more deleted signals from at least one signal; canceling one or more cancelled signals from at least one signal, removing one or more removed signals from at least one signal, subtracting one or more subtracted signals from at least one signal, or the like.

In some demonstrative embodiments, radar data compressor 120 may include a compressor output 173 to provide compressed data 113 including the compressed digital data 115 and signal parameter information defining the one or more wiped-off signals, e.g., as described below.

In one example, the wipe-off criterion may be configured to wipe off a signal, for example, based on a distance of targets in the radar data, e.g., as described below.

In some demonstrative embodiments, the one or more wiped-off signals may correspond to a radar target distance below a predefined distance threshold, e.g., as described below.

In some demonstrative embodiments, the predefined distance threshold may include, for example, a distance of 30 meters or less, e.g., as described below.

In some demonstrative embodiments, the predefined distance threshold may include, for example, a distance of 3 meters or less, e.g., as described below.

In some demonstrative embodiments, the one or more wiped-off signals may include, for example, a leakage signal corresponding to a Tx-Rx leakage of transmitted radar signals from the plurality of Tx antennas 107 to the plurality of Rx antennas 109, e.g., as described below.

In one example, the leakage of transmitted radar signals may have a large and/or dominant impact on performance of the compression of the radar data. According to this example, wiping off the leakage signal may increase performance of the compression.

In some demonstrative embodiments, the one or more wiped-off signals may include, for example, a static-target signal corresponding to a static radar target, e.g., as described below.

In some demonstrative embodiments, the one or more wiped-off signals may include, for example, a dynamic-target signal corresponding to a dynamic radar target, e.g., as described below.

Figure 2:
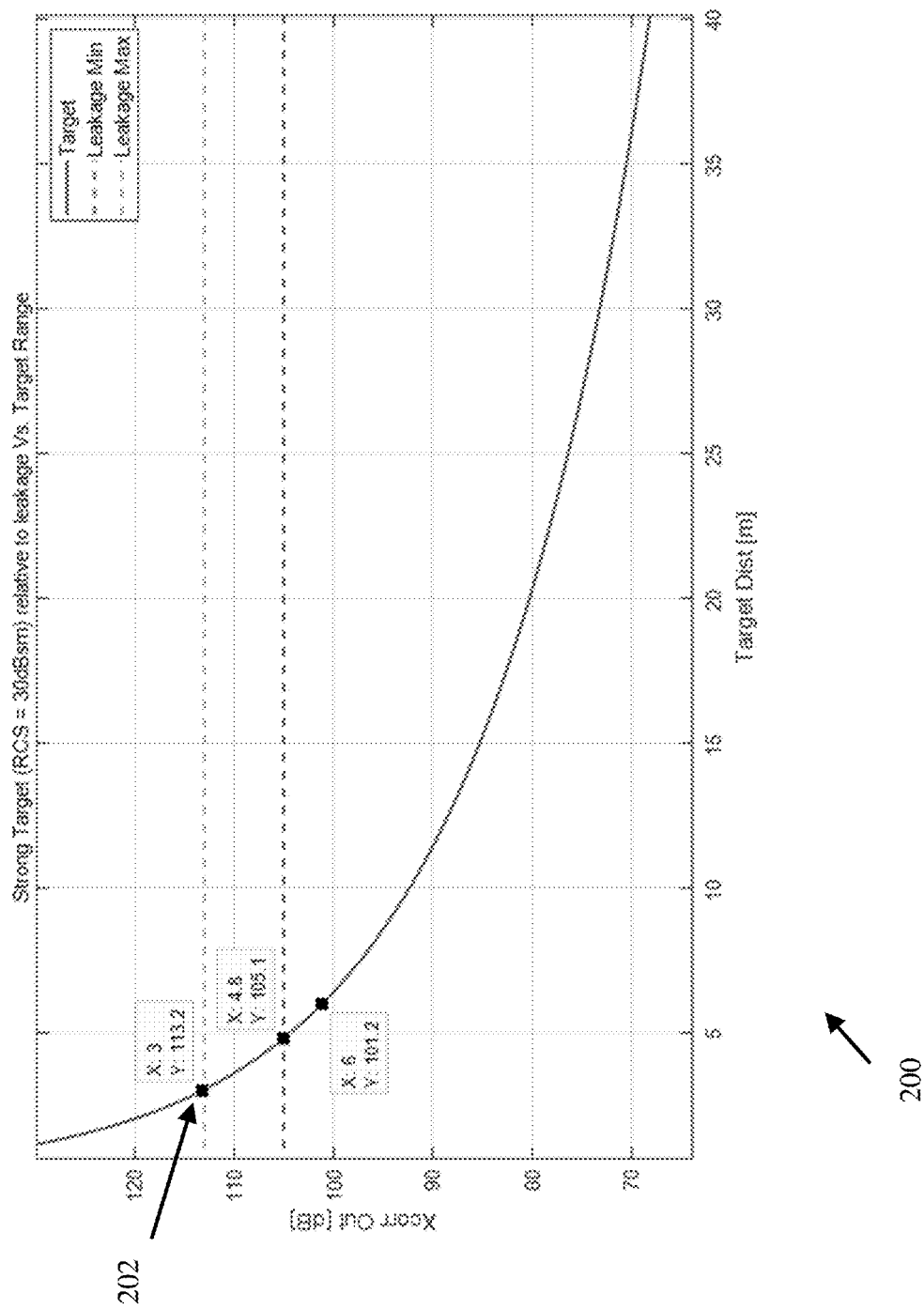
FIG. 2 is a schematic illustration of a graph depicting radar cross correlation as a function of a target distance, in accordance with some demonstrative embodiments.

Reference is made to FIG. 2, which schematically illustrates a graph 200 depicting radar cross correlation as a function of target distance, in accordance with some demonstrative embodiments.

In some demonstrative embodiments, as shown in FIG. 2, a leakage signal may be very dominant in a radar system, e.g., radar 102 (FIG. 1). For example, the leakage signal may be assumed to have an attenuation of 55-75 dB, for example, as a function of the distance between Tx and Rx antenna elements, e.g., between antenna elements of antennas 107 and 109 (FIG. 1).

In some demonstrative embodiments, as shown in FIG. 2, a target 202 may be stronger than the leakage signal, for example, when a Radar Cross Section (RCS) of the target 202 is greater than 30 dBsm, and a range of the target 202 is less than three meters, e.g., RCS>30 and Range<3 m.

In some demonstrative embodiments, radar data compressor 120 (FIG. 1) may be configured to Wipe Off (WO), remove, delete and/or subtract targets at a distance well below a predefined distance threshold, e.g., a distance of 30 m, for example, as above this distance the targets may be much below the noise level.

Figure 3:
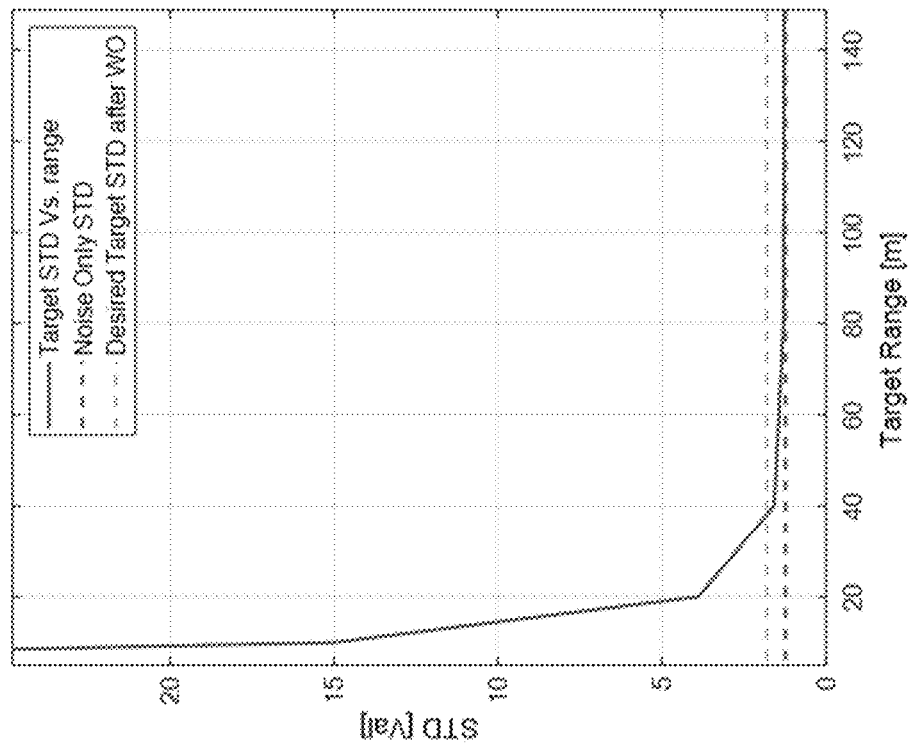
FIG. 3 is a schematic illustration of a first graph depicting a target entropy as a function of target distance, and a second graph depicting a target Standard Deviation (STD) as a function of the target distance, in accordance with some demonstrative embodiments.
Figure 3:
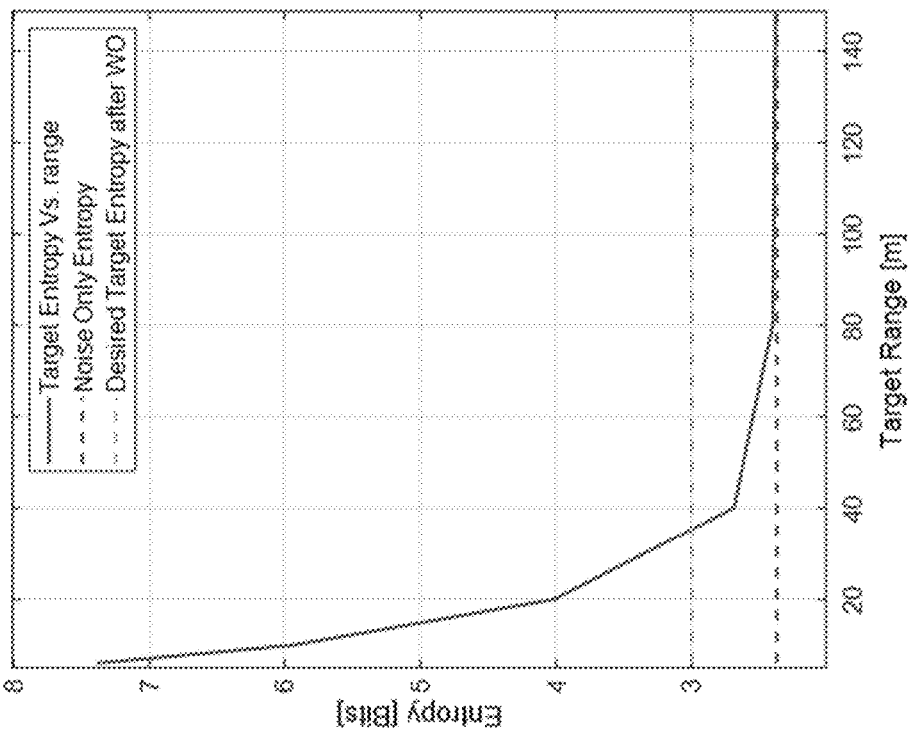

Reference is made to FIG. 3, which schematically illustrates a first graph 310 depicting a target entropy as a function of a target distance, and a second graph 320 depicting a target Standard Deviation (STD) as a function of the target distance, in accordance with some demonstrative embodiments.

A shown in FIG. 3, targets at a distance below 30 m may have an increased entropy and STD.

In some demonstrative embodiments, radar data compressor 120 (FIG. 1) may WO the targets below the distance of 30 m, for example, to achieve a reduced entropy, e.g., below 3, and a reduced STD, e.g., below 2, which may enable to achieve compression of the input digital raw data 111 (FIG. 1), for example, from an average data size of 11 bits to an average data size of about 3 bits, which may provide a compression ratio of about 11/3, e.g., a compression ratio of about 3.7.

Referring back to FIG. 1, in some demonstrative embodiments, raw data compressor 126 may include an encoder 132 to generate the compressed digital data 115, for example, according to a statistical encoding scheme, e.g., as described below.

In some demonstrative embodiments, the statistical encoding scheme may include a Huffman scheme or a Deflate scheme, e.g., as described below.

In other embodiments, the statistical encoding scheme may implement any other encoding scheme.

In some demonstrative embodiments, radar 102 may include a radar data de-compressor 128 to receive the compressed data 113 via the communication channel 103, and to de-compress the compressed digital data 115 into de-compressed digital raw data 129, for example, based on the signal parameter information from raw data compressor 126, e.g., as described below.

In some demonstrative embodiments, radar processor 134 may generate radar information, e.g., range-Doppler response information and/or any other radar information, for example, based on the de-compressed digital raw data 129.

In one example, system controller 124 may control the vehicular systems 118, for example, based on the radar information from radar processor 134. For example, system controller 124 may control a brake system of vehicle 100, for example, based on an indication of an object in the radar information from radar processor 134.

In some demonstrative embodiments, the input digital raw data 111 may include digital samples of received radar signals at 8 or more Rx antennas, for example, of Rx antennas 109, e.g., as described below.

In other embodiments, the input digital raw data 111 may include digital samples of received radar signals at any other number of Rx antennas, e.g., less than 8 Rx antennas or more than 8 Rx antennas.

In one example, Rx antennas 109 may include 64 Rx antenna elements, and Rx chains 119 may include 64 Rx chains. According to this example, 8 radar data compressors, e.g., 8 radar data compressors 120, may be connected to 8 groups of Rx chains, each group including 8 Rx chains, e.g., as described below. In other embodiments, any other scheme including any other count of Rx antennas, Rx chains, and/or radar data compressors may be implemented.

Figure 4:
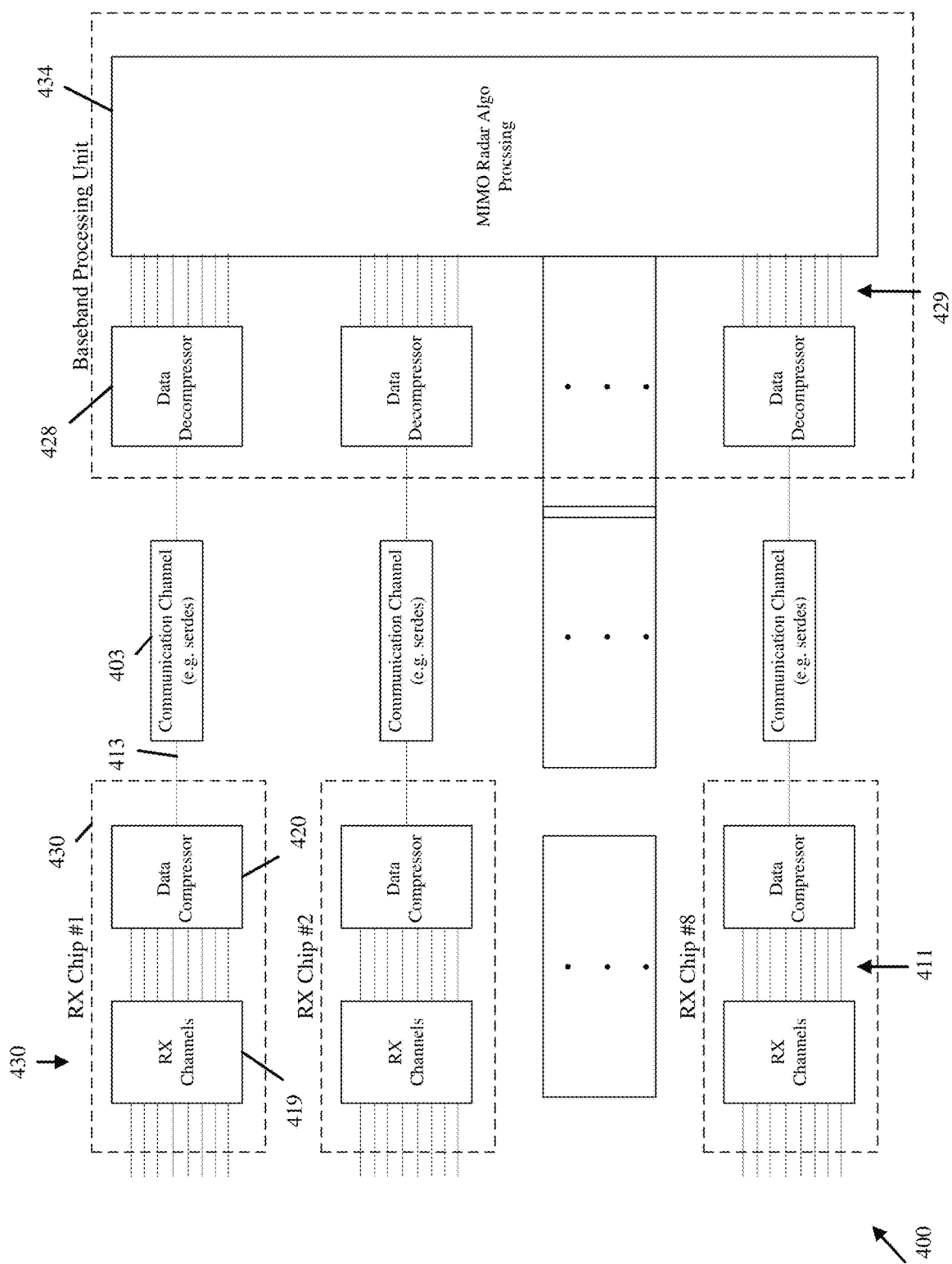
FIG. 4 is a schematic block diagram illustration of a radar processing architecture, in accordance with some demonstrative embodiments.

Reference is made to FIG. 4, which schematically illustrates a radar processing architecture 400, in accordance with some demonstrative embodiments.

In some demonstrative embodiments, as shown in FIG. 4, architecture 400 may include a plurality of Rx chips 430. For example, the plurality of Rx chips 430 may include 8 Rx chips, or any other number of Rx chips.

In some demonstrative embodiments, as shown in FIG. 4, an Rx chip 430 may include a plurality of Rx chains 419, for example 8 Rx chains associated with 8 Rx antennas or any other number of antennas, and a radar data compressor 420, which may receive digital raw data 411 including digital samples of received radar signals at the Rx antennas, and may output compressed data 413 including compressed digital data and signal parameter information. For example, radar data compressor 120 (FIG. 1) may include, operate as, perform one or more operations of, and/or perform the functionality of, radar data compressor 420.

In some demonstrative embodiments, as shown in FIG. 4, Rx chip 430, e.g., each Rx chip 430, may provide compressed data 413 to a radar data de-compressor 428, e.g., via a communication channel 403.

In some demonstrative embodiments, radar data de-compressor 428 may de-compress the compressed digital data 413 into de-compressed digital data 429. For example, radar data de-compressor 126 (FIG. 1) may include, operate as, perform one or more operations of, and/or perform the functionality of, radar data de-compressor 428.

In some demonstrative embodiments, as shown in FIG. 4, architecture 400 may include a radar processor 434, for example, to generate radar information based on the de-compressed digital raw data 429 from the plurality of radar data de-compressors 428. For example, radar processor 134 (FIG. 1) may include, operate as, perform one or more operations of, and/or perform the functionality of, radar processor 434.

Referring back to FIG. 1, in some demonstrative embodiments, radar data processor 120 may be configured to implement a compression scheme, which may be based, for example, at least on target identification of one or more targets, e.g., as described below.

In some demonstrative embodiments, raw data compressor 126 may include a target identifier configured to identify one or more targets, and to provide target information corresponding to the one or more targets, e.g., as described below.

In some demonstrative embodiments, the target identifier may identify the one or more targets by applying the wipe-off criterion to estimated 4D radar information, which is based on the input digital raw data, e.g., as described below.

In some demonstrative embodiments, raw data compressor 126 may include a signal wiper, signal remover, signal deleter, and/or signal subtractor configured to generate wiped data, post-removal data, post-deletion data, and/or post-subtraction data, for example, by wiping off, removing, deleting, and/or subtracting, the one or more wiped-off, removed, deleted and/or subtracted signals, for example, based on the target information, e.g., as described below.

In some demonstrative embodiments, the compressed digital data 115 may be based on the wiped data, e.g., as described below.

In some demonstrative embodiments, the signal wiper may wipe-off the one or more wiped-off signals, for example, based on the target information and template information defining transmitted radar signals from the plurality of Tx antennas 107, e.g., as described below.

In some demonstrative embodiments, the signal parameter information may include the target information, e.g., as described below.

In some demonstrative embodiments, raw data compressor 126 may include a 4D radar estimator configured to estimate the 4D radar information, for example, based on the input digital raw data 111, e.g., as described below.

In some demonstrative embodiments, the radar data compressor 120 may be configured to receive the 4D radar information from radar processor 134 and/or any other element of vehicle 100, e.g., as described below.

In one example, radar compressor 120 may be configured to use 4D radar information, for example, to get a list of target parameters, e.g., a list including an azimuth, an elevation, a range, and/or Doppler, and to predict received signal time domain samples of a Tx-Rx leakage and/or the strong targets, which may be, for example, above a thermal noise level, e.g., at an Rx chain of a Digital Front End (DFE) output.

In one example, radar compressor 120 may subtract, delete, and/or remove, e.g., wipe off, the Tx-Rx leakage signal and the strong target signals from input signal 111, for example, to reduce the signal level, for example, a peak to peak, a Standard deviation, and/or an entropy of the signal, e.g., after predicting the Tx-Rx leakage signal and the strong targets signals.

Figure 5:
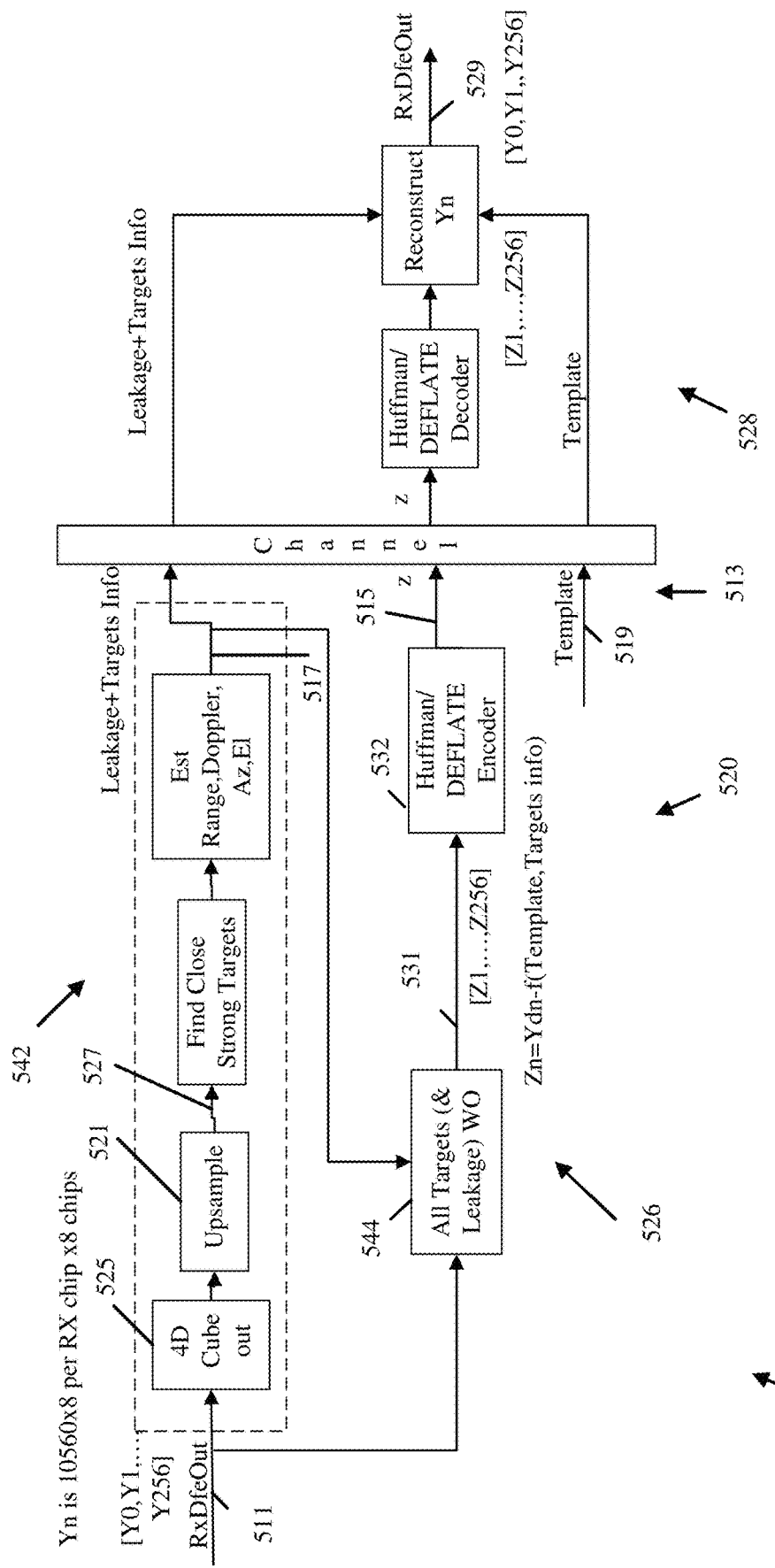
FIG. 5 is a schematic block diagram illustration of a radar data compression scheme, in accordance with some demonstrative embodiments.

Reference is made to FIG. 5, which schematically illustrates a block diagram of a radar data compression scheme 500, in accordance with some demonstrative embodiments.

In some demonstrative embodiments, as shown in FIG. 5, radar data compression scheme 500 may include a radar data compressor 520 configured to receive input digital raw data 511 and to output compressed data 513 including compressed digital data 515 and signal parameter information 517. For example, radar data compressor 120 (FIG. 1) may include, operate as, perform one or more operations of, and/or perform the functionality of, radar data compressor 520.

In some demonstrative embodiments, as shown in FIG. 5, radar data compressor 520 may include a raw data compressor 526 to compress the input digital raw data 511 into the compressed digital data 515. For example, raw data compressor 126 (FIG. 1) may include, operate as, perform one or more operations of, and/or perform the functionality of, raw data compressor 526.

In some demonstrative embodiments, as shown in FIG. 5, raw data compressor 526 may include a target identifier 542 configured to identify one or more targets, and to provide target information 517 corresponding to the one or more targets, for example, by applying a wipe-off criterion to estimated 4D radar information 527, e.g., as described below.

In some demonstrative embodiments, as shown in FIG. 5, raw data compressor 526 may include a signal wiper 544 configured to generate wiped data 531, for example, by wiping off one or more wiped-off signals, for example, based on the target information 517, e.g., as described below.

In some demonstrative embodiments, as shown in FIG. 5, raw data compressor 526 may include a 4D radar estimator 525 configured to estimate the 4D radar information 527, for example, based on the input digital raw data 511, e.g., as described below.

In other embodiments, radar data compressor 520 may be configured to receive the 4D radar information 527 from a radar processor, for example, radar processor 134 (FIG. 1).

In some demonstrative embodiments, as shown in FIG. 5, raw data compressor 526 may include an encoder 532 to generate the compressed digital data 515, for example, according to a statistical encoding scheme, e.g., a Huffman scheme, a Deflate scheme, and/or any other scheme, e.g., as described below.

In some demonstrative embodiments, as shown in FIG. 5, radar data compression scheme 500 may include a radar data de-compressor 528 to receive the compressed data 513, e.g., via a communication channel 503, and to de-compress the compressed data 513 into de-compressed digital raw data 529, e.g., as described below.

In some demonstrative embodiments, radar data compressor 520 may be configured to process input digital raw data 511, e.g., including data of 257 chirps, denoted Y0, . . . , Y256, in the form of DFE out matrices from 8 or more Rx chips, e.g., with a size of 10560×8 complex samples.

In some demonstrative embodiments, a 4D radar estimator 525 may be configured to process input digital raw data 511, e.g., by performing 4D cube processing.

In some demonstrative embodiments, an upsampler 521 may be configured to upsample an output of the 4D cube 525, e.g., by an up-sampling factor of by 5 or any other factor, e.g., to find close strong targets, e.g., equivalent to a Peak to Peak SNR (PPSNR) of 30 dBsm Radar cross-section (RCS) and below 30 m. For example, targets above 30 m may be weak and, therefore irrelevant.

In one example, target identifier 542 may take the strong targets detection metrics, e.g., including Azimuth, Elevation, Range, and Doppler, as and/or leakage metrics, from a baseband processing unit, e.g., radar processor 134 (FIG. 1), and may create a list of targets, e.g., to be included in signal parameter information 517.

In some demonstrative embodiments, target identifier 542 may be configured to process parameters of the close and/or strong targets, e.g., after finding the strong targets, for example, to determine a list of targets and transmitting the list to a BB processing unit, and signal wiper 544 may be configured to wipe off the strong targets, for example, by applying the target parameters to a reference signal, e.g., a radar template signal 519. For example, radar template 519 may define and/or represent the Tx radar signals on which the input digital raw data is based. In some demonstrative embodiments, signal wiper 544 may be configured to transfer wiped data 531, which may include the wiped off signals (Z1, . . . , Z256) to an encoder 532, e.g., a Huffman encoder or a Deflate encoder, which may further compress the residual signal 531 to provide the compressed digital data 515.

In some demonstrative embodiments, radar data compressor 520 may be configured to generate the compressed data 513 to include the compressed digital data 515, the target information 517, e.g., including the list of targets which were wiped off by signal wiper 544, and the template information 519.

For example, radar data compressor 520 may be configured to pack the data elements 515, 517, and 519 and send the packet data through the channel 503.

In some demonstrative embodiments, radar data de-compressor 528 may be configured to perform unpacking of the compressed data 513, and to decompress the compressed digital data 515, for example, by "undoing" the compression based on the target information 517 and the template information 519. For example, radar data de-compressor 528 may unpack the compressed data 513, apply Huffman decoding to the compressed digital data 515, and generate de-compressed digital raw data 529 by reconstructing the compressed digital data, for example, based on the parameters of the subtracted and/or wiped off signals, e.g., including the leakage and the strong targets.

Figure 6:
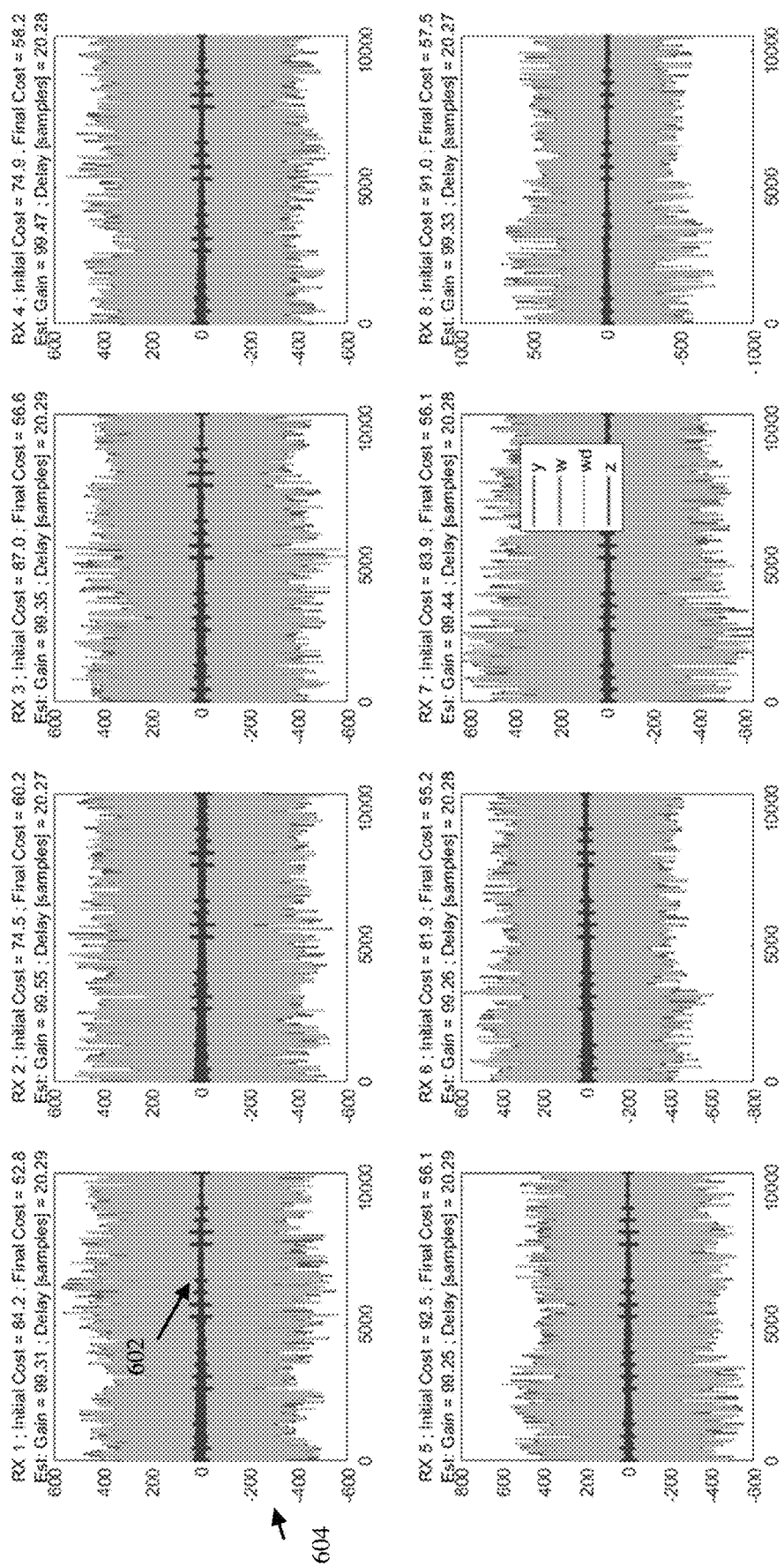
FIG. 6 is a schematic illustration of graphs depicting wiped off signals based on digital raw radar data, in accordance with some demonstrative embodiments.

Reference is made to FIG. 6, which schematically illustrates graphs depicting and wiped off signals 602 based on digital raw radar data 604, in accordance with some demonstrative embodiments.

In some demonstrative embodiments, as shown in FIG. 6, the digital raw radar data 604 may correspond to digital samples of received radar signals at 8 respective Rx antennas, for example, in a 30 m target scenario.

In some demonstrative embodiments, wiped off signals 602 may be generated, for example, by signal wiper 544 (FIG. 5), for example, by wiping off the leakage and/or strong signals from digital raw radar data 604, e.g., as described above.

In some demonstrative embodiments, as shown in FIG. 6, wiped off signals 602 may include a very small residual of the digital raw data 604.

Figure 7:
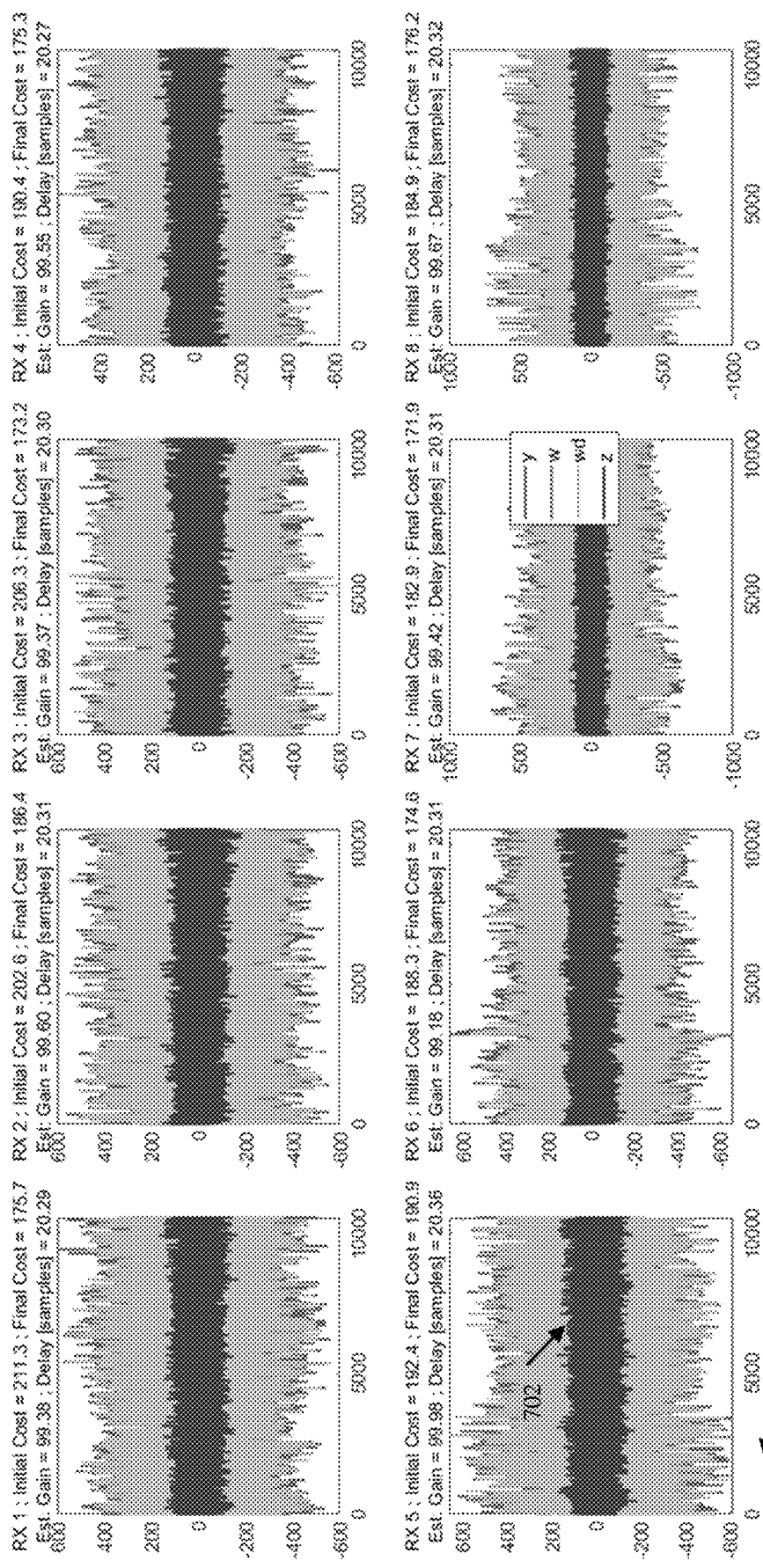
FIG. 7 is a schematic illustration of graphs depicting wiped off signals based on digital raw radar data, in accordance with some demonstrative embodiments.

Reference is made to FIG. 7, which schematically illustrates graphs depicting wiped off signals 702 based on digital raw radar data 704, in accordance with some demonstrative embodiments.

In some demonstrative embodiments, as shown in FIG. 7, the received digital raw radar data 704 may correspond to digital samples of received radar signals at 8 Rx antennas, for example, in a 6 m target scenario.

In some demonstrative embodiments, wiped off signals 702 may be generated, for example, by signal wiper 544 (FIG. 5), for example, by wiping off the leakage and/or strong signals from digital raw radar data 704, e.g., as described above.

In some demonstrative embodiments, as shown in FIG. 7, wiped off signals 702 may include a residual of the digital raw radar data 704, which may not be negligible, e.g., compared to the residual obtained by signals 602 (FIG. 6) for the 30 m target scenario.

Figure 8:
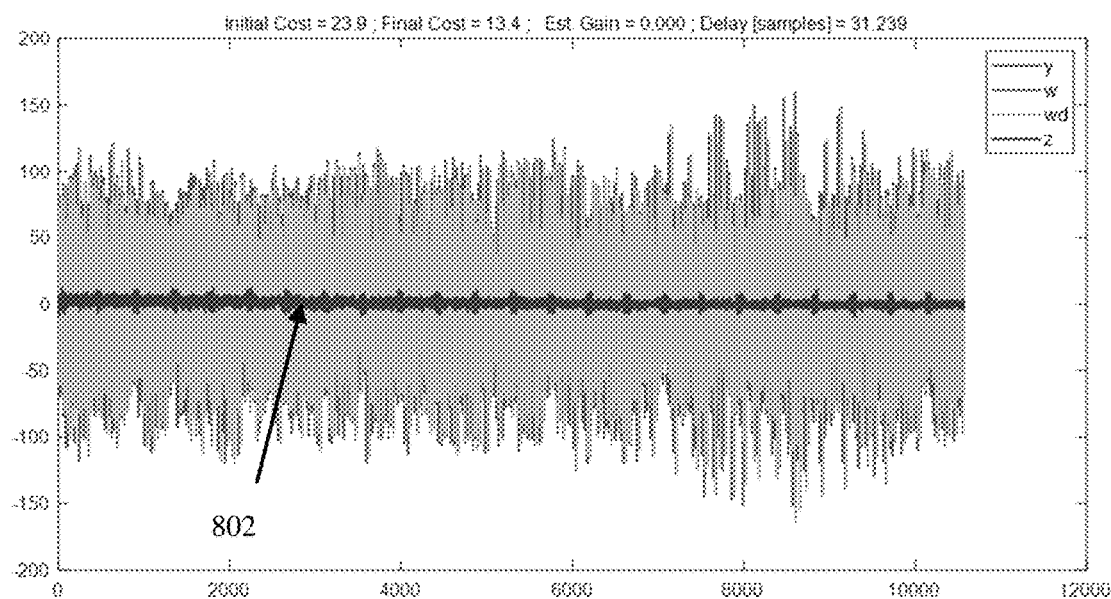
FIG. 8 is a schematic illustration of graphs depicting a wiped off signal based on digital raw radar data, in accordance with some demonstrative embodiments.
Figure 8:
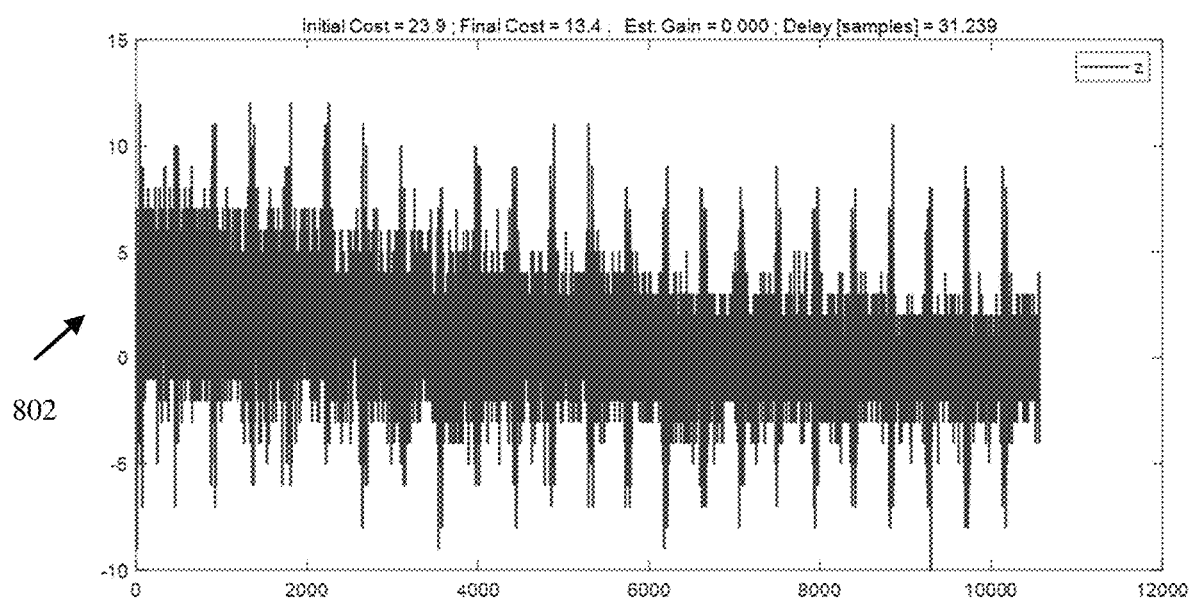

Reference is made to FIG. 8, which schematically illustrates graphs depicting a wiped off signal 802, in accordance with some demonstrative embodiments.

In one example wiped off signal 802 may be based on wiped off signal 702 (FIG. 7), for example, after wiping of the target at 6 m.

In one example, as shown in FIG. 8, an entropy of the wiped off signal 802, e.g., after wiping of the target at 6 m, may be about ~3.3.

Referring back to FIG. 1, in some demonstrative embodiments, radar data compressor 120 may be configured to implement a compression scheme to compress the digital raw data 111 based, for example, on at least a time-domain differentiation, e.g., as described below.

In some demonstrative embodiments, radar data compressor 120 may be configured to compress the digital raw data 111, for example, according a 3-Step lossless compression algorithm, e.g., as described below.

In some demonstrative embodiments, radar data compressor 120 may be configured to wipe Off (WO) Tx2Rx leakage and/or strong, close, and/or static targets, for example, by applying a differentiation between chirps. In one example, in some scenarios and/or use cases, a large portions, e.g., most, of the close targets may be static targets, e.g., a road, a car in traffic and/or the like.

In some demonstrative embodiments, radar data compressor 120 may be configured to estimate a complex scalar ratio between Rx antennas, for example, between an Rx antenna of antennas 109, denoted $Rx_i$, and a Reference (Ref) antenna of antennas 109, denoted Rx1, for example, by subtraction of the data from Rx1 from the Rx antenna $Rx_i$, e.g., $Rx-Rx_i$.

In some demonstrative embodiments, radar data compressor 120 may be configured to use target information, e.g., from a 4D cube, to predict a signal at each Rx chain 119, and to WO each target based on the target information, for example, in addition to or instead of estimating the complex scalar ratio.

In some demonstrative embodiments, radar data compressor 120 may be configured to encode residual TD signals, e.g., noise and/or targets below noise level, for example, using statistical encoding, e.g., a Huffman encoding scheme, a DEFLATE scheme (Huffman+LZ77), and/or any other encoding scheme. For example, the Huffman scheme may achieve almost (~95%) of a compression bound (entropy), and, therefore, may be sufficient and relatively simple to implement.

In some embodiments, some or all of the 3-Step lossless compression algorithm may be implemented.

In some demonstrative embodiments, performing the first operation of the 3-Step lossless compression algorithm, e.g., the differentiation between chirps, may reduce a large amount, e.g., most, of a level of the input raw radar signals.

In some demonstrative embodiments, raw data compressor 126 may include a time-differential signal wiper configured to wipe off one or more wiped-off signals from the input digital raw data, for example, based on a time-domain differentiation between consecutive digital sample pairs of the input digital raw data, e.g., as described below.

In some demonstrative embodiments, raw data compressor 126 may include a target identifier to identify one or more targets, for example, by applying the wipe-off criterion to estimated radar range information. For example, the estimated radar information may be based on the input digital raw data 111, e.g., as described below.

In some demonstrative embodiments, raw data compressor 126 may include an Rx-differential estimator to estimate Rx-differential target parameters corresponding to the targets, e.g., as described below.

In some demonstrative embodiments, an Rx-differential target parameter may be based on a first target parameter value corresponding to a first Rx antenna of Rx antennas 109, and a second target parameter value corresponding to a second Rx antenna 109 of Rx antennas 109, e.g., as described below.

In some demonstrative embodiments, raw data compressor 126 may include an Rx-differential signal wiper 927 configured to wipe off one or more Rx-differential signals from an output 922 of the time-differential signal wiper 921, for example, based on the Rx-differential target parameters, e.g., as described below.

In one example, raw data compressor 126 may be configured to differentiate between chirps, for example, in a time-domain, e.g., to wipe off the strong static targets and the leakage signal. In some use cases or scenarios, this differentiation may wipe off a large part of, e.g., most of, the Rx signal energy. Remaining signals may be wiped off, for example, by estimating a flat fading channel response, for example, between different Rx chains relative to an Rx chain (Rxi-Rx1), for example, e.g., a complex scalar for each chain as described below.

Figure 9:
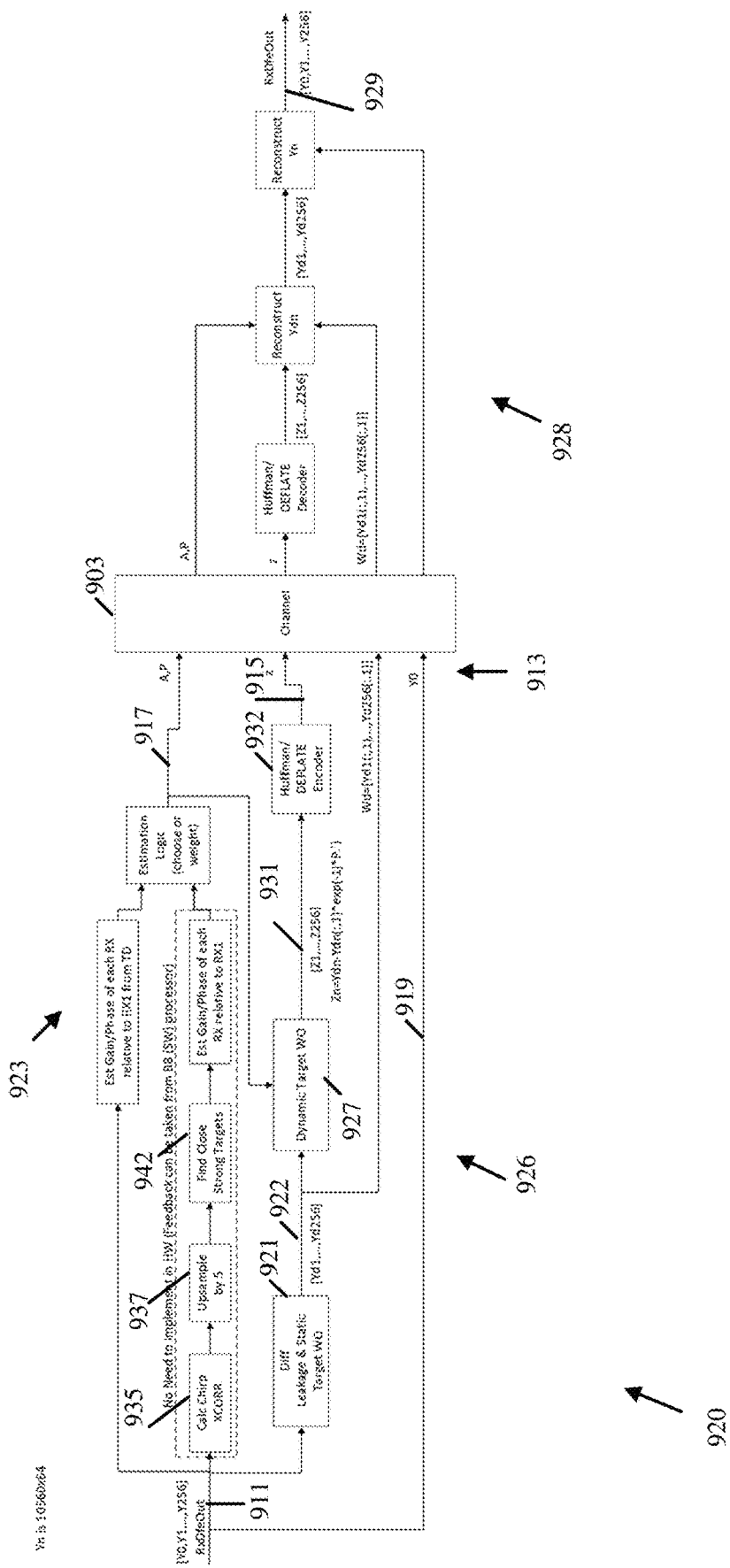
FIG. 9 is a schematic block diagram illustration of a radar data compression scheme, in accordance with some demonstrative embodiments.

Reference is made to FIG. 9, which schematically illustrates a block diagram of a radar data compression scheme 900, in accordance with some demonstrative embodiments.

In some demonstrative embodiments, as shown in FIG. 9, radar data compression scheme 900 may include radar data compressor 920 configured to receive input digital raw data 911, and to output compressed data 913 including compressed digital data 915 and signal parameter information 917. For example, radar data compressor 120 (FIG. 1) may include, operate as, perform one or more operations of, and/or perform the functionality of, radar data compressor 920.

In some demonstrative embodiments, as shown in FIG. 9, radar data compressor 920 may include a raw data compressor 926 to compress the input digital raw data 911 into compressed digital data 915. For example, raw data compressor 126 (FIG. 1) may include, operate as, perform one or more operations of, and/or perform the functionality of, raw data compressor 926.

In some demonstrative embodiments, as shown in FIG. 9, raw data compressor 926 may include a time-differential signal wiper 921 configured to wipe off one or more wiped-off signals from the input digital raw data 911, for example, based on time-domain differentiation between pairs of the consecutive digital samples of the input digital raw data 911, e.g., as described below.

In some demonstrative embodiments, as shown in FIG. 9, raw data compressor 926 may include a target identifier 942 configured to identify one or more targets, for example, by applying a wipe-off criterion to estimated radar range information, for example, wherein the estimated radar range information is based on the input digital raw data 911, e.g., as described below.

In some demonstrative embodiments, as shown in FIG. 9, raw data compressor 926 may include an Rx-differential estimator 923 to estimate Rx-differential target parameters corresponding to the targets, e.g., as described below. For example, Rx-differential estimator 923 may generate the signal parameter information 917 based on the Rx-differential target parameters.

In some demonstrative embodiments, Rx-differential signal wiper 927 may be configured to wipe off one or more Rx-differential signals from the output 922 of the time-differential signal wiper 921, for example, based on the Rx-differential target parameters 917, e.g., as described below.

In some demonstrative embodiments, as shown in FIG. 9, raw data compressor 926 may include an encoder 932 to generate the compressed digital data 915, for example, according to a statistical encoding scheme, e.g., a Huffman scheme, a Deflate scheme, and/or any other scheme, e.g., as described below.

In some demonstrative embodiments, as shown in FIG. 9, radar compression scheme 900 may include a radar data de-compressor 928 to receive the compressed data 913 via a communication channel 903, and to de-compress the compressed data 913 into de-compressed digital raw data 929.

In some demonstrative embodiments, radar data compressor 920 may be configured to process input digital raw data 911, e.g., including data of 247 chirps, denoted Y0, . . . , Y256, in the form of DFEout matrices from 8 Rx chips, e.g., with a data size of 10560×8 complex samples.

In some demonstrative embodiments, radar data compressor 920 may include a cross correlation (XCORR) block 935 configured to perform an XCORR process to determine cross correlation information based on the input digital raw data 911.

In some demonstrative embodiments, radar data compressor 920 may include an upsampler 937 configured to up-sample an output 936 of the XCORR block 935, e.g., by an up-sampling factor of 5 or any other factor, for example, in order to find close strong targets, e.g., equivalent to a PPSNR of 30 dBsm RCS and below 30 m. For example, targets above 30 m may be weak and, therefore irrelevant.

In some demonstrative embodiments, Rx-differential estimator 923 may be configured to estimate a gain/phase from time-domain (TD) signals. The TD estimated signals may be used to wipe off strong target and/or leakage. In one example, Rx-differential estimator 923 may estimate a complex vector response of the strong targets relative to the reference antenna Rx1, and Rx-differential signal wiper 927 may wipe off the strong targets from output 922.

In some demonstrative embodiments, Rx-differential signal wiper 927 may be configured to output the wiped off signals 931 (Z1, . . . , Z256) to Huffman encoder 932, which may further compress the residual signal 931 with Huffman coding.

In some demonstrative embodiments, radar data compressor 920 may be configured to generate the compressed data 913 to include the compressed digital data 915, the target information 917, e.g., the parameters of the targets which were wiped off by signal wiper 927, and information 919 corresponding to a reference signal used by the signal wiper 921.

For example, radar data compressor 920 may be configured to pack the data elements 915, 917, and 919 and send the packet data through the channel 903.

In some demonstrative embodiments, radar data de-compressor 928 may be configured to perform unpacking of the compressed data 913, and to decompress the compressed digital data 915, for example, by "undoing" the compression based on the target information 917 and the reference information 919. For example, radar data de-compressor 928 may unpack the compressed data 913, apply Huffman decoding to the compressed digital data 915, and generate de-compressed digital raw data 929 by reconstructing the compressed digital data, for example, based on the parameters of the subtracted and/or wiped off signals, e.g., including the leakage and the strong targets.

Figure 10:
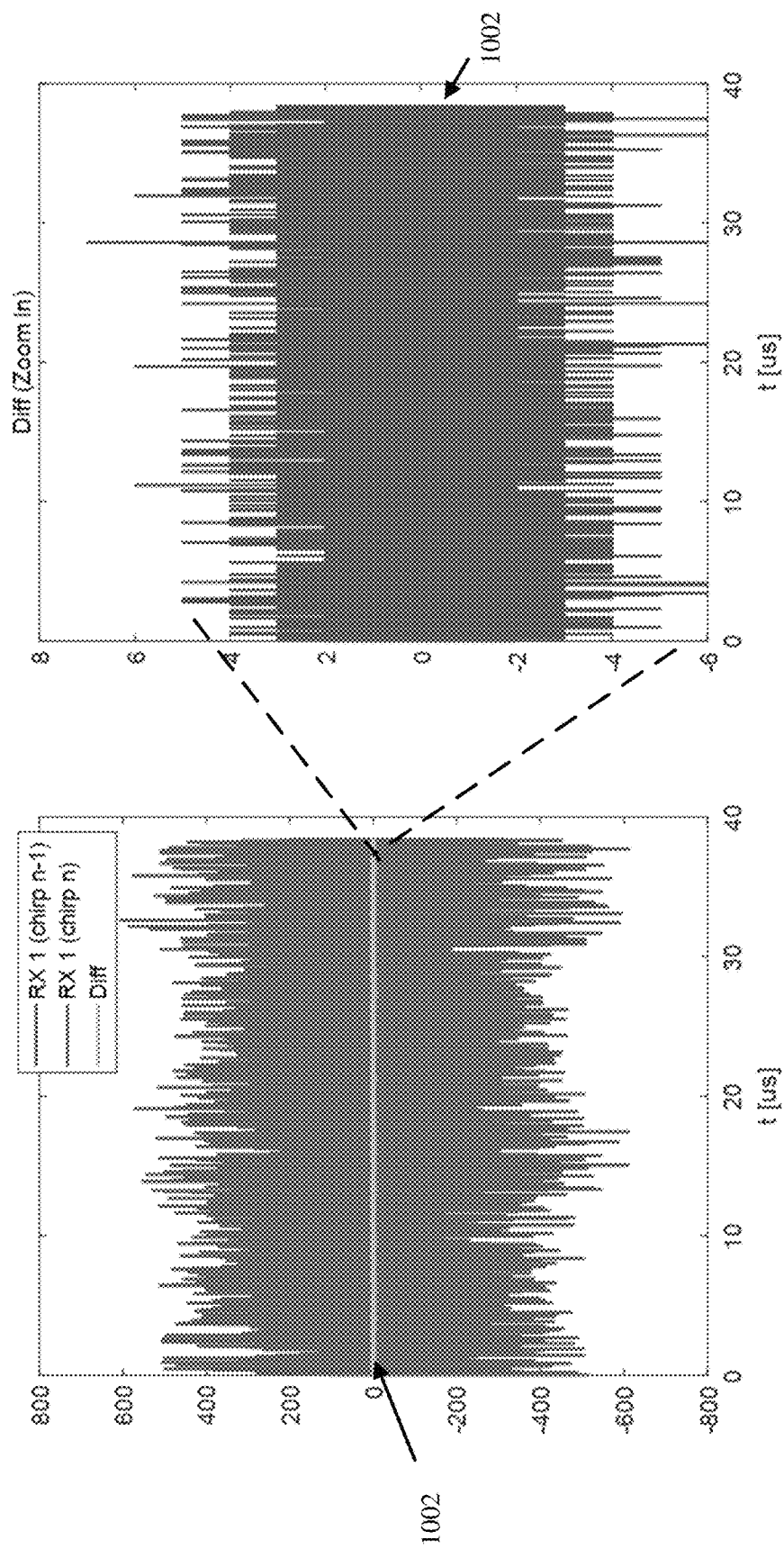
FIG. 10 is a schematic illustration of graphs depicting a residual signal after time-differentiation of digital raw radar data, in accordance with some demonstrative embodiments.

Reference is made to FIG. 10, which schematically illustrates graphs depicting a residual 1002 after time-differentiation of digital raw radar data, in accordance with some demonstrative embodiments.

In some demonstrative embodiments, time-differential signal wiper 921 (FIG. 9) may generate residual 1002, for example, by differentiating between two consecutive chirps of digital raw radar data 911 (FIG. 9), e.g., as described above.

In some demonstrative embodiments, as shown in FIG. 10, residual 1002 may be at a level of the noise floor and may be narrow.

Figure 11:
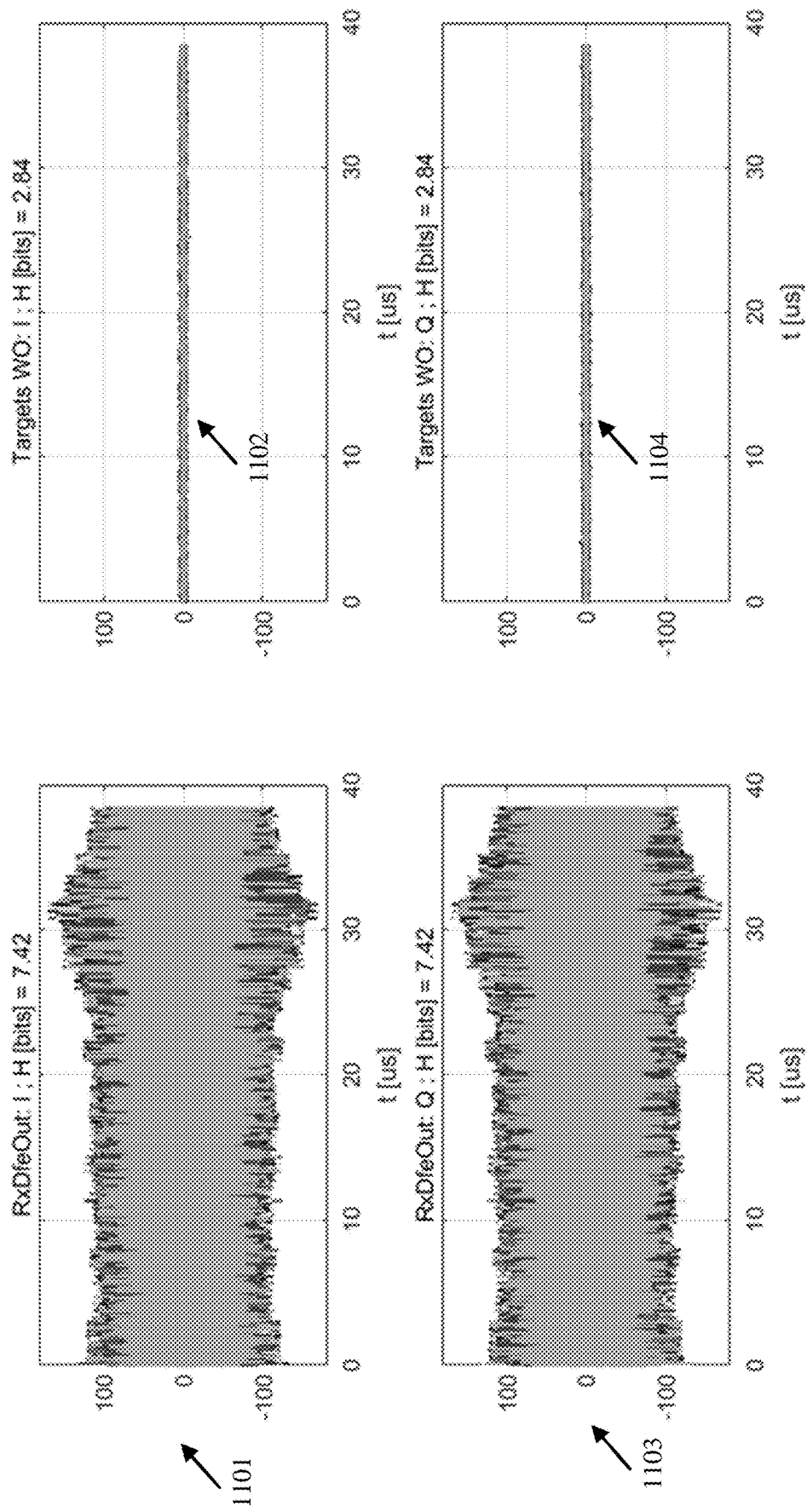
FIG. 11 is a schematic illustration of graphs depicting a wiped off signal based on I component digital raw radar data, and wiped off signal based on Q component digital raw radar data, in accordance with some demonstrative embodiments.

Reference is made to FIG. 11, which schematically illustrates graphs depicting a wiped off signal 1102 based on I component digital raw radar data 1101, and wiped off signal 1104 based on Q component digital raw radar data 1103, in accordance with some demonstrative embodiments.

In some demonstrative embodiments, time-differential signal wiper 921 (FIG. 9) may generate wiped off signal 1102 by differentiating between two consecutive chirps of digital raw radar data 1101, and/or may generate wiped off signal 1104 by differentiating between two consecutive chirps of digital raw radar data 1103, e.g., as described above.

In some demonstrative embodiments, as shown in FIG. 11, residuals obtained by the wiped off signals 1102 and 1104 may be at a level of a noise floor and may be narrow.

Figure 12:
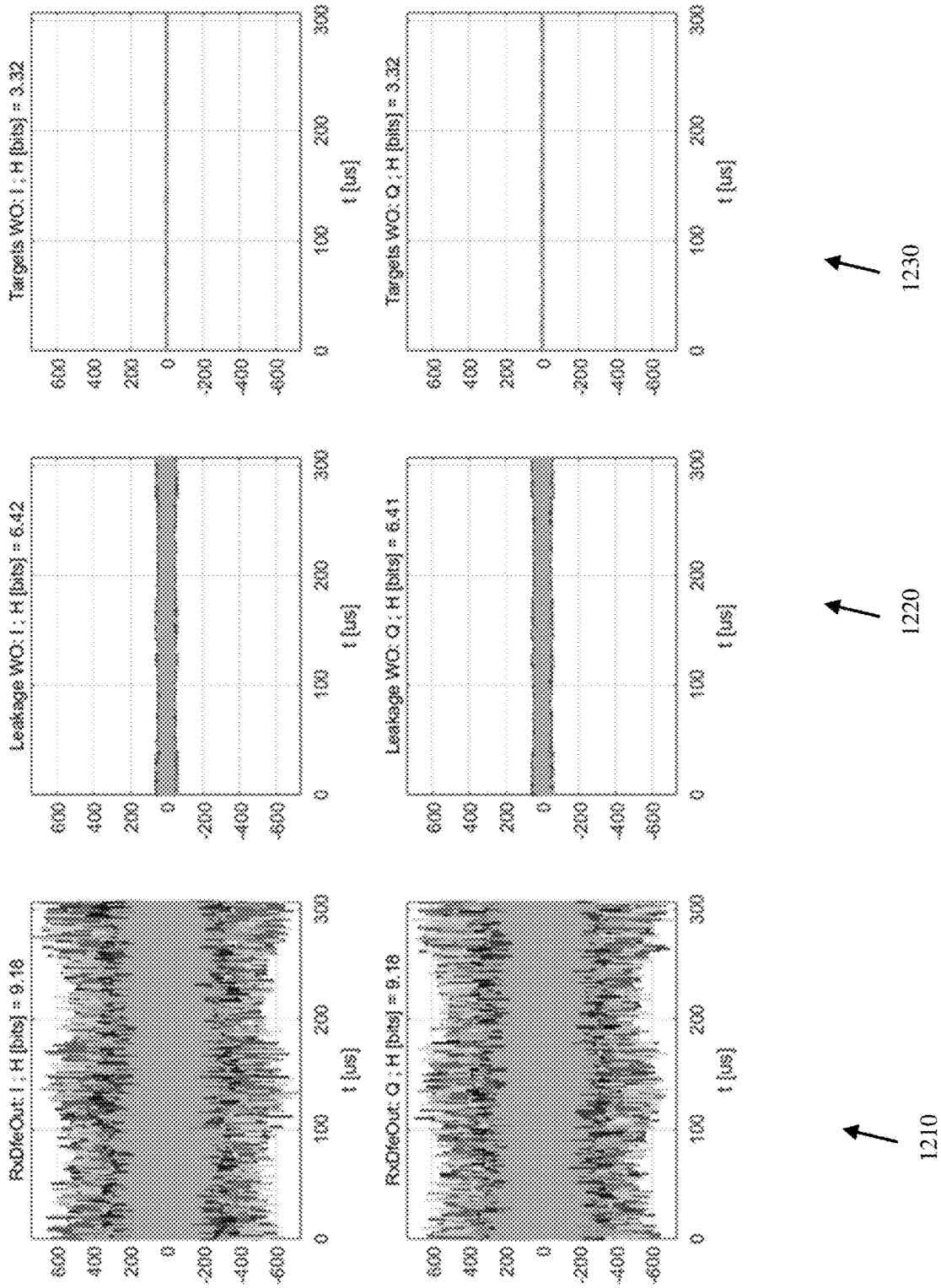
FIG. 12 is a schematic illustration of graphs depicting a first wiped-off signal based on digital raw radar data, and a second wiped-off signal based on the first wiped-off signal, in accordance with some demonstrative embodiments.

Reference is made to FIG. 12, which schematically illustrates graphs depicting a first wiped-off signal 1220 based on digital raw radar data 1210, and a second wiped-off signal 1230 based on the first wiped-off signal 1220, in accordance with some demonstrative embodiments.

In one example, digital raw radar data 1210 may be obtained, for example, in a scenario including dynamic targets, e.g., having velocities of 10 m/s and 4 m/s, respectively.

In some demonstrative embodiments, wiped-off signal 1220 may be generated, for example, by time-differential signal wiper 921 (FIG. 9), for example, based on digital raw radar data 1210, e.g., as described above.

In some demonstrative embodiments, as shown in FIG. 12, a portion of the digital raw radar data 1210 may be wiped off, e.g., by time-differential signal wiper 921 (FIG. 9), while a residual may not be negligible and may require further wipe off, e.g., by signal wiper 927 (FIG. 9).

In some demonstrative embodiments, wiped-off signal 1230 may be generated, for example, by signal wiper 927 (FIG. 9), for example, based on wiped-off signal 1220, e.g., as described above.

In some demonstrative embodiments, as shown in FIG. 12, wiped-off signal 1230 may have a narrower residual, for example, after the dynamic wipe off by Rx-differential signal wiper 927 (FIG. 9), e.g., by subtracting ratios to the Rx antenna (Rx1).

Figure 13:
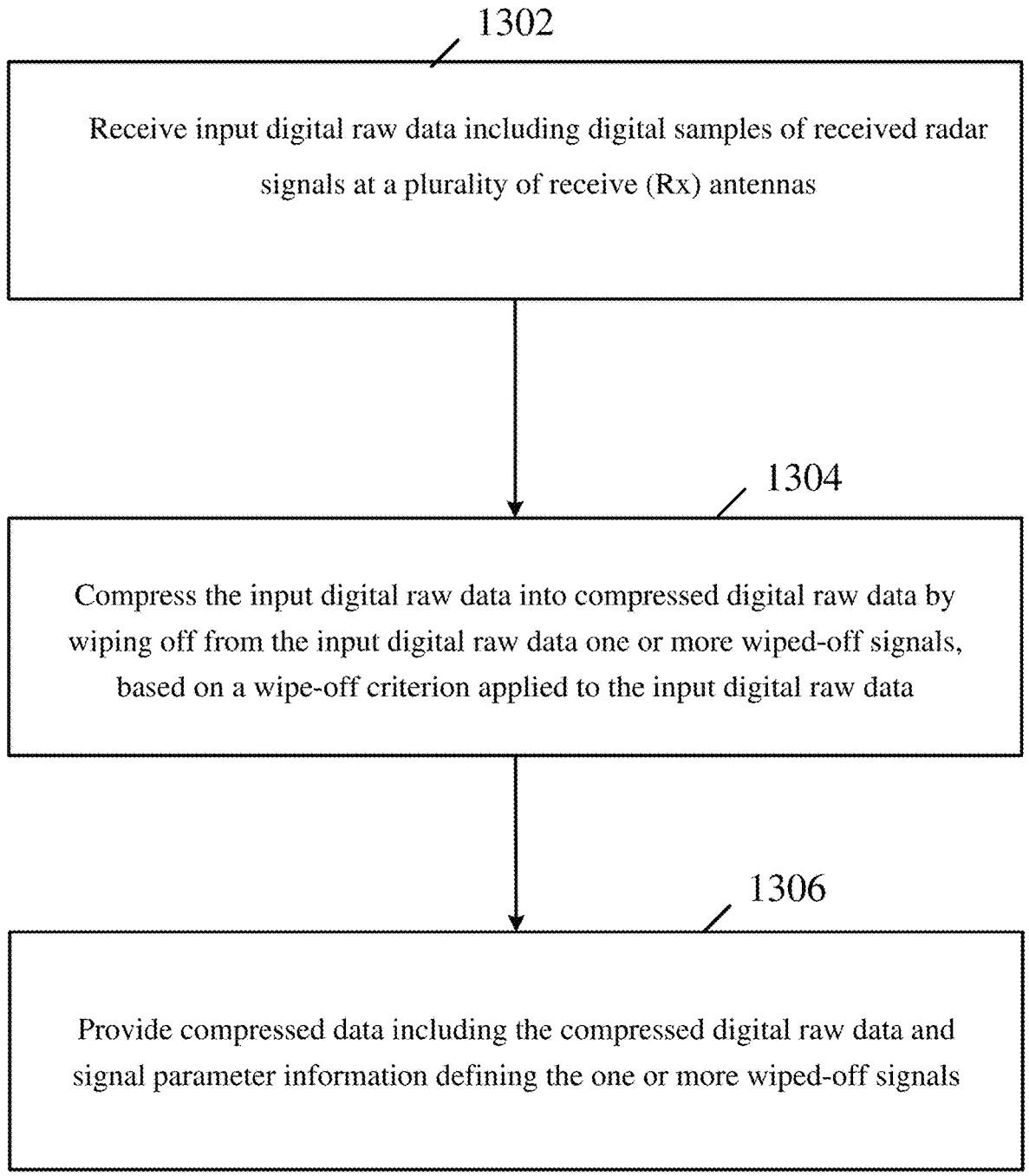
FIG. 13 is a schematic flow chart illustration of a method of radar data compression, in accordance with some demonstrative embodiments.

Reference is made to FIG. 13, which schematically illustrates a method of a radar data compression, in accordance with some demonstrative embodiments. For example, one or more operations of the method of FIG. 13 may be performed by one or more elements of a vehicle, e.g., vehicle 100 (FIG. 1), for example, a radar, e.g., radar 102 (FIG. 1), a radar data compressor, e.g., radar data compressor 120 (FIG. 1), radar data compressor 520 (FIG. 5), and/or radar data compressor 920 (FIG. 9), a raw data compressor, e.g., raw data compressor 126 (FIG. 1), raw data compressor 526 (FIG. 5), and/or raw data compressor 926 (FIG. 9), a system controller, e.g., system controller 124 (FIG. 1), and/or radar processor, e.g., radar processor 134 (FIG. 1),.

As indicated at block 1302, the method may include receiving input digital raw data including digital samples of received radar signals at a plurality of Rx antennas. For example, radar data compressor 120 (FIG. 1) may receive input digital raw data 111 (FIG. 1) including digital samples of received radar signals at the plurality of Rx antennas 109 (FIG. 1), e.g., as described above.

As indicated at block 1304, the method may include compressing the input digital raw data into compressed digital data by wiping off from the input digital raw data one or more wiped-off signals, based on a wipe-off criterion applied to the input digital raw data. For example, radar data compressor 120 (FIG. 1) may compress the input digital raw data 111 (FIG. 1) into compressed digital data 115 (FIG. 1), for example, by wiping off from the input digital raw data input digital raw data 111 (FIG. 1) the one or more wiped-off signals, based on the wipe-off criterion applied to the input digital raw data 111 (FIG. 1), e.g., as described above.

As indicated at block 1306, the method may include providing compressed data including the compressed digital data and signal parameter information defining the one or more wiped-off signals. For example, radar data compressor 120 (FIG. 1) may provide the compressed data 113 (FIG. 1) including the compressed digital data 115 (FIG. 1) and the signal parameter information defining the one or more wiped-off signals, e.g., as described above.

Figure 14:
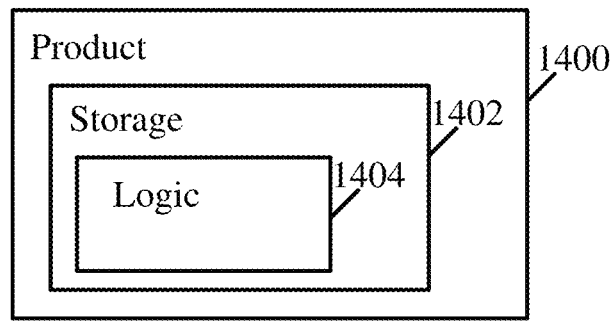
FIG. 14 is a schematic illustration of a product of manufacture, in accordance with some demonstrative embodiments.

Reference is made to FIG. 14, which schematically illustrates a product of manufacture 1400, in accordance with some demonstrative embodiments. Product 1400 may include one or more tangible computer-readable ("machine-readable") non-transitory storage media 1402, which may include computer-executable instructions, e.g., implemented by logic 1404, operable to, when executed by at least one computer processor, enable the at least one computer processor to implement one or more operations at vehicle 100 (FIG. 1), radar 102 (FIG. 1), radar data compressor 120 (FIG. 1), radar data compressor 520 (FIG. 5), radar data compressor 920 (FIG. 9), raw data compressor 126 (FIG. 1), raw data compressor 526 (FIG. 5), raw data compressor 926 (FIG. 9), system controller 124 (FIG. 1), and/or radar processor 134 (FIG. 1), to cause vehicle 100 (FIG. 1), radar 102 (FIG. 1), radar data compressor 120 (FIG. 1), radar data compressor 520 (FIG. 5), radar data compressor 920 (FIG. 9), raw data compressor 126 (FIG. 1), raw data compressor 526 (FIG. 5), raw data compressor 926 (FIG. 9), system controller 124 (FIG. 1), and/or radar processor 134 (FIG. 1), to perform, trigger and/or implement one or more operations and/or functionalities, and/or to perform, trigger and/or implement one or more operations and/or functionalities described with reference to the FIGS. 1, 2, 3, 4, 5, 6, 7, 8, 9, 10, 11, 12 and/or 13, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 1400 and/or machine-readable storage media 1402 may include one or more types of computer-readable storage media capable of storing data, including volatile memory, non-volatile memory, removable or non-removable memory, erasable or non-erasable memory, writeable or re-writeable memory, and the like. For example, machine-readable storage media 1402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a radar data compressor, the radar data compressor comprising an input to receive input digital raw data comprising digital samples of received radar signals at a plurality of Receive (Rx) antennas; a raw data compressor configured to compress the input digital raw data into compressed digital data, for example, wherein the raw data compressor is configured to remove, delete, cancel, and/or subtract one or more wiped-off, deleted, cancelled and/or subtracted signals from the input digital raw data, based on a wipe-off, deletion, cancellation criterion and/or subtraction criterion, e.g., applied to the input digital raw data; and a compressor output to provide compressed data comprising the compressed digital data and signal parameter information defining the one or more wiped-off signals.

Example 2 includes the subject matter of Example 1, and optionally, wherein the one or more wiped-off signals correspond to a radar target distance below a predefined distance threshold.

Example 3 includes the subject matter of Example 2, and optionally, wherein the predefined distance threshold comprises a distance of 30 meters or less.

Example 4 includes the subject matter of Example 2, and optionally, wherein the predefined distance threshold comprises a distance of 3 meters or less.

Example 5 includes the subject matter of any one of Examples 1-4, and optionally, wherein the one or more wiped-off signals comprise a leakage signal corresponding to a leakage of transmitted radar signals from a plurality of Transmit (Tx) antennas to the plurality of Rx antennas.

Example 6 includes the subject matter of any one of Examples 1-5, and optionally, wherein the one or more wiped-off signals comprise a static-target signal corresponding to a static radar target.

Example 7 includes the subject matter of any one of Examples 1-6, and optionally, wherein the one or more wiped-off signals comprise a dynamic-target signal corresponding to a dynamic radar target.

Example 8 includes the subject matter of any one of Examples 1-7, and optionally, wherein the raw data compressor comprises a target identifier to identify one or more targets and to provide target information corresponding to the one or more targets, the target identifier to identify the one or more targets by applying the wipe-off criterion to estimated 4 dimensional (4D) radar information, e.g., wherein the 4D radar information may be based on the input digital raw data; and a signal wiper to generate wiped data by wiping off the one or more wiped-off signals based on the target information, wherein the compressed digital data is based on the wiped data.

Example 9 includes the subject matter of Example 8, and optionally, wherein the signal wiper is to wipe-off the one or more wiped-off signals based on the target information and template information defining transmitted radar signals from a plurality of Transmit (Tx) antennas.

Example 10 includes the subject matter of Example 8 or 9, and optionally, wherein the radar data compressor is configured to receive the 4D radar information from a radar processor.

Example 11 includes the subject matter of Example 8 or 9, and optionally, wherein the raw data compressor comprises a 4D radar estimator configured to estimate the 4D radar information based on the input digital raw data.

Example 12 includes the subject matter of any one of Examples 8-11, and optionally, wherein the signal parameter information comprises the target information.

Example 13 includes the subject matter of any one of Examples 1-7, and optionally, wherein the raw data compressor comprises a time-differential signal wiper configured to wipe off the one or more wiped-off signals from the input digital raw data based on a time-domain differentiation between pairs of consecutive digital samples of the input digital raw data.

Example 14 includes the subject matter of Example 13, and optionally, wherein the raw data compressor comprises a target identifier to identify one or more targets by applying the wipe-off criterion to estimated radar range information, for example, wherein the estimated radar range information is based on the input digital raw data; an Rx-differential estimator to estimate Rx-differential target parameters corresponding to the targets, an Rx-differential target parameter based on a first target parameter value corresponding to a first Rx antenna and a second target parameter value corresponding to a second Rx antenna; and an Rx-differential signal wiper configured to wipe off one or more Rx-differential signals from an output of the time-differential signal wiper based on the Rx-differential target parameters.

Example 15 includes the subject matter of any one of Examples 1-14, and optionally, wherein the raw data compressor comprises an encoder to generate the compressed digital data according to a statistical encoding scheme.

Example 16 includes the subject matter of Example 15, and optionally, wherein the statistical encoding scheme comprises a Huffman scheme or a Deflate scheme.

Example 17 includes the subject matter of any one of Examples 1-16, and optionally, wherein the input digital raw data comprises digital samples of received radar signals at 8 or more Rx antennas.

Example 18 includes the subject matter of any one of Examples 1-17, and optionally, comprising a plurality of Transmit (Tx) antennas to transmit Tx radar signals; the plurality of Rx antennas to receive the received radar signals based on the Tx radar signals; a communication channel to communicate the compressed data from the radar data compressor; a radar data de-compressor to receive the compressed data via the communication channel and to de-compress the compressed digital data into de-compressed digital raw data based on the signal parameter information; and a radar processor to generate radar information based on the de-compressed digital raw data.

Example 19 includes the subject matter of Example 18, and optionally, comprising a vehicle.

Example 20 includes a Multiple-Input-Multiple-Output (MIMO) radar comprising a plurality of Transmit (Tx) antennas to transmit Tx radar signals; a plurality of Receive (Rx) antennas to receive Rx radar signals based on the Tx radar signals; a Digital Front End (DFE) to provide input digital raw data comprising digital samples of the Rx radar signals; a radar data compressor configured to compress the input digital raw data into compressed digital data, for example, wherein the raw data compressor is configured to remove, delete, cancel, and/or subtract one or more wiped-off, deleted, cancelled and/or subtracted signals from the input digital raw data, based on a wipe-off, deletion, cancellation criterion and/or subtraction criterion, e.g., applied to the input digital raw data, for example, the radar data compressor configured to provide compressed data comprising the compressed digital data and signal parameter information defining the one or more wiped-off signals; a communication channel to communicate the compressed data from the radar data compressor; a radar data de-compressor to receive the compressed data via the communication channel and to de-compress the compressed digital data into de-compressed digital raw data based on the signal parameter information; and a radar processor to generate radar information based on the de-compressed digital raw data.

Example 21 includes the subject matter of Example 20, and optionally, wherein the one or more wiped-off signals correspond to a radar target distance below a predefined distance threshold.

Example 22 includes the subject matter of Example 21, and optionally, wherein the predefined distance threshold comprises a distance of 30 meters or less.

Example 23 includes the subject matter of Example 21, and optionally, wherein the predefined distance threshold comprises a distance of 3 meters or less.

Example 24 includes the subject matter of any one of Examples 20-23, and optionally, wherein the one or more wiped-off signals comprise a leakage signal corresponding to a leakage of the Tx radar signals from the plurality of Tx antennas to the plurality of Rx antennas.

Example 25 includes the subject matter of any one of Examples 20-24, and optionally, wherein the one or more wiped-off signals comprise a static-target signal corresponding to a static radar target.

Example 26 includes the subject matter of any one of Examples 20-25, and optionally, wherein the one or more wiped-off signals comprise a dynamic-target signal corresponding to a dynamic radar target.

Example 27 includes the subject matter of any one of Examples 20-26, and optionally, wherein the radar data compressor comprises a target identifier to identify one or more targets and to provide target information corresponding to the one or more targets, the target identifier to identify the one or more targets by applying the wipe-off criterion to estimated 4 dimensional (4D) radar information, e.g., wherein the 4D radar information may be based on the input digital raw data; and a signal wiper to generate wiped data by wiping off the one or more wiped-off signals based on the target information, wherein the compressed digital data is based on the wiped data.

Example 28 includes the subject matter of Example 27, and optionally, wherein the signal wiper is to wipe-off the one or more wiped-off signals based on the target information and template information defining the Tx radar signals.

Example 29 includes the subject matter of Example 27 or 28, and optionally, wherein the radar data compressor is configured to receive the 4D radar information from the radar processor.

Example 30 includes the subject matter of Example 27 or 28, and optionally, wherein the radar data compressor comprises a 4D radar estimator configured to estimate the 4D radar information based on the input digital raw data.

Example 31 includes the subject matter of any one of Examples 27-30, and optionally, wherein the signal parameter information comprises the target information.

Example 32 includes the subject matter of any one of Examples 20-26, and optionally, wherein the radar data compressor comprises a time-differential signal wiper configured to wipe off the one or more wiped-off signals from the input digital raw data based on a time-domain differentiation between consecutive digital sample pairs of the input digital raw data.

Example 33 includes the subject matter of Example 32, and optionally, wherein the radar data compressor comprises a target identifier to identify one or more targets by applying the wipe-off criterion to estimated radar range information, for example, wherein the estimated radar range information is based on the input digital raw data; an Rx-differential estimator to estimate Rx-differential target parameters corresponding to the targets, an Rx-differential target parameter based on a first target parameter value corresponding to a first Rx antenna and a second target parameter value corresponding to a second Rx antenna; and an Rx-differential signal wiper configured to wipe off one or more Rx-differential signals from an output of the time-differential signal wiper based on the Rx-differential target parameters.

Example 34 includes the subject matter of any one of Examples 20-33, and optionally, wherein the radar data compressor comprises an encoder to generate the compressed digital data according to a statistical encoding scheme.

Example 35 includes the subject matter of Example 34, and optionally, wherein the statistical encoding scheme comprises a Huffman scheme or a Deflate scheme.

Example 36 includes the subject matter of any one of Examples 20-35, and optionally, wherein the input digital raw data comprises digital samples of received radar signals at 8 or more Rx antennas.

Example 37 includes a vehicle comprising a Multiple-Input-Multiple-Output (MIMO) radar comprising a plurality of Transmit (Tx) antennas to transmit Tx radar signals; a plurality of Receive (Rx) antennas to receive Rx radar signals based on the Tx radar signals; a Digital Front End (DFE) to provide input digital raw data comprising digital samples of the Rx radar signals; a radar data compressor configured to compress the input digital raw data into compressed digital data, for example, wherein the raw data compressor is configured to remove, delete, cancel, and/or subtract one or more wiped-off, deleted, cancelled and/or subtracted signals from the input digital raw data, based on a wipe-off, deletion, cancellation criterion and/or subtraction criterion, e.g., applied to the input digital raw data, the radar data compressor configured to provide compressed data comprising the compressed digital data and signal parameter information defining the one or more wiped-off signals; a communication channel to communicate the compressed data from the radar data compressor; a radar data de-compressor to receive the compressed data via the communication channel and to de-compress the compressed digital data into de-compressed digital raw data based on the signal parameter information; and a radar processor to generate radar information based on the de-compressed digital raw data; and a system controller configured to control one or more vehicular systems of the vehicle based on the radar information.

Example 38 includes the subject matter of Example 37, and optionally, wherein the one or more wiped-off signals correspond to a radar target distance below a predefined distance threshold.

Example 39 includes the subject matter of Example 38, and optionally, wherein the predefined distance threshold comprises a distance of 30 meters or less.

Example 40 includes the subject matter of Example 38, and optionally, wherein the predefined distance threshold comprises a distance of 3 meters or less.

Example 41 includes the subject matter of any one of Examples 37-40, and optionally, wherein the one or more wiped-off signals comprise a leakage signal corresponding to a leakage of the Tx radar signals from the plurality of Tx antennas to the plurality of Rx antennas.

Example 42 includes the subject matter of any one of Examples 37-41, and optionally, wherein the one or more wiped-off signals comprise a static-target signal corresponding to a static radar target.

Example 43 includes the subject matter of any one of Examples 37-42, and optionally, wherein the one or more wiped-off signals comprise a dynamic-target signal corresponding to a dynamic radar target.

Example 44 includes the subject matter of any one of Examples 37-43, and optionally, wherein the radar data compressor comprises a target identifier to identify one or more targets and to provide target information corresponding to the one or more targets, the target identifier to identify the one or more targets by applying the wipe-off criterion to estimated 4 dimensional (4D) radar information, e.g., wherein the 4D radar information may be based on the input digital raw data; and a signal wiper to generate wiped data by wiping off the one or more wiped-off signals based on the target information, wherein the compressed digital data is based on the wiped data.

Example 45 includes the subject matter of Example 44, and optionally, wherein the signal wiper is to wipe-off the one or more wiped-off signals based on the target information and template information defining the Tx radar signals.

Example 46 includes the subject matter of Example 44 or 45, and optionally, wherein the radar data compressor is configured to receive the 4D radar information from the radar processor.

Example 47 includes the subject matter of Example 44 or 45, and optionally, wherein the radar data compressor comprises a 4D radar estimator configured to estimate the 4D radar information based on the input digital raw data.

Example 48 includes the subject matter of any one of Examples 44-47, and optionally, wherein the signal parameter information comprises the target information.

Example 49 includes the subject matter of any one of Examples 37-43, and optionally, wherein the radar data compressor comprises a time-differential signal wiper configured to wipe off the one or more wiped-off signals from the input digital raw data based on a time-domain differentiation between pairs of consecutive digital samples of the input digital raw data.

Example 50 includes the subject matter of Example 49, and optionally, wherein the radar data compressor comprises a target identifier to identify one or more targets by applying the wipe-off criterion to estimated radar range information, for example, wherein the estimated radar range information is based on the input digital raw data; an Rx-differential estimator to estimate Rx-differential target parameters corresponding to the targets, an Rx-differential target parameter based on a first target parameter value corresponding to a first Rx antenna and a second target parameter value corresponding to a second Rx antenna; and an Rx-differential signal wiper configured to wipe off one or more Rx-differential signals from an output of the time-differential signal wiper based on the Rx-differential target parameters.

Example 51 includes the subject matter of any one of Examples 37-50, and optionally, wherein the radar data compressor comprises an encoder to generate the compressed digital data according to a statistical encoding scheme.

Example 52 includes the subject matter of Example 51, and optionally, wherein the statistical encoding scheme comprises a Huffman scheme or a Deflate scheme.

Example 53 includes the subject matter of any one of Examples 37-52, and optionally, wherein the input digital raw data comprises digital samples of received radar signals at 8 or more Rx antennas.

Example 54 comprises an apparatus comprising means for executing any of the described operations of Examples 1-53.

Example 55 comprises a machine-readable medium that stores instructions for execution by a processor to perform any of the described operations of Examples 1-53.

Example 56 comprises a method to perform any of the described operations of Examples 1-53.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a radar data compressor, the radar data compressor comprising:
    an input to receive input digital raw data comprising digital samples of received radar signals at a plurality of Receive (Rx) antennas;
    a raw data compressor configured to compress the input digital raw data into compressed digital data, wherein the raw data compressor is configured to wipe off one or more wiped-off signals from the input digital raw data, based on a wipe-off criterion, wherein the raw data compressor comprises a time-differential signal wiper configured to wipe off the one or more wiped-off signals from the input digital raw data based on a time-domain differentiation between consecutive digital sample pairs of the input digital raw data; and
    an output to provide compressed data comprising the compressed digital data and signal parameter information defining the one or more wiped-off signals.

2. The apparatus of claim 1, wherein the one or more wiped-off signals correspond to a radar target distance below a predefined distance threshold.

3. The apparatus of claim 2, wherein the predefined distance threshold comprises a distance of 30 meters or less.

4. The apparatus of claim 2, wherein the predefined distance threshold comprises a distance of 3 meters or less.

5. The apparatus of claim 1, wherein the one or more wiped-off signals comprise a leakage signal corresponding to a leakage of transmitted radar signals from a plurality of Transmit (Tx) antennas to the plurality of Rx antennas.

6. The apparatus of claim 1, wherein the one or more wiped-off signals comprise a static-target signal corresponding to a static radar target.

7. The apparatus of claim 1, wherein the one or more wiped-off signals comprise a dynamic-target signal corresponding to a dynamic radar target.

8. The apparatus of claim 1, wherein the raw data compressor comprises:
    a target identifier to identify one or more targets and to provide target information corresponding to the one or more targets, the target identifier to identify the one or more targets by applying the wipe-off criterion to estimated 4 dimensional (4D) radar information, wherein the estimated 4D radar information is based on the input digital raw data; and
    a signal wiper to generate wiped data by wiping off the one or more wiped-off signals based on the target information, wherein the compressed digital data is based on the wiped data.

9. The apparatus of claim 8, wherein the signal wiper is to wipe-off the one or more wiped-off signals based on the target information and template information defining transmitted radar signals from a plurality of Transmit (Tx) antennas.

10. The apparatus of claim 8, wherein the radar data compressor is configured to receive the 4D radar information from a radar processor.

11. The apparatus of claim 8, wherein the raw data compressor comprises a 4D radar estimator configured to estimate the 4D radar information based on the input digital raw data.

12. The apparatus of claim 8, wherein the signal parameter information comprises the target information.

13. The apparatus of claim 1, wherein the raw data compressor comprises:
    a target identifier to identify one or more targets by applying the wipe-off criterion to estimated radar range information, wherein the estimated radar range information is based on the input digital raw data;
    an Rx-differential estimator to estimate Rx-differential target parameters corresponding to the targets, wherein an Rx-differential target parameter is based on a first target parameter value corresponding to a first Rx antenna and a second target parameter value corresponding to a second Rx antenna; and
    an Rx-differential signal wiper configured to wipe off one or more Rx-differential signals from an output of the time-differential signal wiper based on the Rx-differential target parameters.

14. The apparatus of claim 1, wherein the raw data compressor comprises an encoder to generate the compressed digital data according to a statistical encoding scheme.

15. The apparatus of claim 14, wherein the statistical encoding scheme comprises a Huffman scheme or a Deflate scheme.

16. The apparatus of claim 1 comprising:
    a plurality of Transmit (Tx) antennas to transmit Tx radar signals;
    the plurality of Rx antennas to receive the received radar signals based on the Tx radar signals;
    a communication channel to communicate the compressed data from the radar data compressor;
    a radar data de-compressor to receive the compressed data via the communication channel and to de-compress the compressed digital data into de-compressed digital raw data based on the signal parameter information; and
    a radar processor to generate radar information based on the de-compressed digital raw data.

17. A Multiple-Input-Multiple-Output (MIMO) radar comprising:
    a plurality of Transmit (Tx) antennas to transmit Tx radar signals;
    a plurality of Receive (Rx) antennas to receive Rx radar signals based on the Tx radar signals;
    a Digital Front End (DFE) to provide input digital raw data comprising digital samples of the Rx radar signals;
    a radar data compressor configured to compress the input digital raw data into compressed digital data, wherein the radar data compressor is to remove from the input digital raw data one or more removed signals, based on a removal criterion, wherein the radar data compressor comprises a time-differential signal remover configured to remove the one or more removed signals from the input digital raw data based on a time-domain differentiation between consecutive digital sample pairs of the input digital raw data, the radar data compressor configured to provide compressed data comprising the compressed digital data and signal parameter information defining the one or more removed signals;

a communication channel to communicate the compressed data from the radar data compressor;

a radar data de-compressor to receive the compressed data via the communication channel and to de-compress the compressed digital data into de-compressed digital raw data based on the signal parameter information; and a radar processor to generate radar information based on the de-compressed digital raw data.

18. The MIMO radar of claim 17, wherein the one or more removed signals correspond to a radar target distance below a predefined distance threshold.

19. The MIMO radar of claim 17, wherein the one or more removed signals comprise a leakage signal corresponding to a leakage of the Tx radar signals from the plurality of Tx antennas to the plurality of Rx antennas.

20. The MIMO radar of claim 17, wherein the radar data compressor comprises:

a target identifier to identify one or more targets and to provide target information corresponding to the one or more targets, the target identifier to identify the one or more targets by applying the removal criterion to estimated 4 dimensional (4D) radar information, wherein the estimated 4D radar information is based on the input digital raw data; and a signal remover to generate post-removal data by removing the one or more removed signals based on the target information, wherein the compressed digital data is based on the post-removal data.

21. The MIMO radar of claim 17, wherein the radar data compressor comprises an encoder to generate the compressed digital data according to a statistical encoding scheme.

22. A vehicle comprising:

a Multiple-Input-Multiple-Output (MIMO) radar comprising:

a plurality of Transmit (Tx) antennas to transmit Tx radar signals;

a plurality of Receive (Rx) antennas to receive Rx radar signals based on the Tx radar signals;

a Digital Front End (DFE) to provide input digital raw data comprising digital samples of the Rx radar signals;

a radar data compressor configured to compress the input digital raw data into compressed digital data, wherein the raw data compressor is configured to wipe off one or more wiped-off signals from the input digital raw data, based on a wipe-off criterion, wherein the radar data compressor comprises a time-differential signal wiper configured to wipe off the one or more wiped-off signals from the input digital raw data based on a time-domain differentiation between consecutive digital sample pairs of the input digital raw data, the radar data compressor configured to provide compressed data comprising the compressed digital data and signal parameter information defining the one or more wiped-off signals;

a communication channel to communicate the compressed data from the radar data compressor;

a radar data de-compressor to receive the compressed data via the communication channel and to de-compress the compressed digital data into de-compressed digital raw data based on the signal parameter information; and a radar processor to generate radar information based on the de-compressed digital raw data; and a system controller configured to control one or more vehicular systems of the vehicle based on the radar information.

23. The vehicle of claim 22, wherein the one or more wiped-off signals correspond to a radar target distance below a predefined distance threshold.

24. The vehicle of claim 22, wherein the one or more wiped-off signals comprise a leakage signal corresponding to a leakage of the Tx radar signals from the plurality of Tx antennas to the plurality of Rx antennas.

* * * * *